(12) United States Patent
Galbraith

(10) Patent No.: US 6,720,698 B2
(45) Date of Patent: Apr. 13, 2004

(54) ELECTRICAL PULSE GENERATOR USING PSEUDO-RANDOM POLE DISTRIBUTION

(75) Inventor: Richard Leo Galbraith, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 115 days.

(21) Appl. No.: 10/108,792

(22) Filed: Mar. 28, 2002

(65) Prior Publication Data

US 2003/0184179 A1 Oct. 2, 2003

(51) Int. Cl.[7] .............................................. H02K 17/00
(52) U.S. Cl. ........................ 310/166; 310/168; 310/171; 310/153; 310/70 A; 310/70 R; 123/149 R
(58) Field of Search ................................ 310/166, 153, 310/171, 70 A, 70 R, 168; 123/149 R; 322/4, 8, 62

(56) References Cited

U.S. PATENT DOCUMENTS

| | | | |
|---|---|---|---|
| 3,169,203 A | | 2/1965 | Lavin et al. |
| 3,619,634 A | * | 11/1971 | Burson ........................ 307/10.6 |
| 3,723,809 A | * | 3/1973 | Fujii ............................ 315/211 |
| 4,079,712 A | * | 3/1978 | Nagasawa ............... 123/406.57 |
| 4,200,831 A | | 4/1980 | Weldon et al. .................. 322/8 |
| 4,266,180 A | | 5/1981 | Juvan ............................. 322/4 |
| 4,746,862 A | | 5/1988 | Ueki |
| 4,779,454 A | * | 10/1988 | Fitzner et al. ................. 73/116 |
| 4,935,708 A | | 6/1990 | Weldon et al. ................. 322/62 |
| 5,072,714 A | * | 12/1991 | Bengtsson et al. ........... 123/601 |
| 5,530,309 A | | 6/1996 | Weldon ....................... 310/178 |
| 5,721,461 A | | 2/1998 | Taylor ........................ 310/268 |

FOREIGN PATENT DOCUMENTS

| | | | |
|---|---|---|---|
| JP | 01 069240 A | 3/1989 | |
| JP | 09 168296 A | 6/1997 | |
| SU | 1575273 | 6/1990 | .......... H02K/25/00 |
| WO | WO 91/09223 A | 6/1991 | |
| WO | WO 92/00453 A | 1/1992 | |

\* cited by examiner

Primary Examiner—Thanh Lam
(74) Attorney, Agent, or Firm—Roy W. Truelson

(57) ABSTRACT

A multi-pole electric pulse generator contains poles having a pseudo-random distribution. Preferably, poles are equally sized and spaced, and polarity corresponds to a pseudo-noise binary sequence, which is specifically a primitive polynomial m-sequence. At one point in the rotor's revolution, all rotor poles are aligned with corresponding stator poles to provide maximum net magnetic flux through the armature windings. At all other rotor positions, the poles are misaligned so that the net flux through the armature windings is small. In operation, rotation through the misaligned rotor positions produces essentially no flux change so that no electric power is generated. When the rotor reaches the aligned position, there is a sudden, large flux change which generates a high-energy electric pulse. The exemplary application is for generating an ignition spark of an internal combustion engine.

70 Claims, 10 Drawing Sheets

ELECTRICAL PULSE GENERATOR USING PSEUDO-RANDOM POLE DISTRIBUTION

FIELD OF THE INVENTION

The present invention relates to electric generators, and in particular, to generators of a type which generate discrete electric pulses.

BACKGROUND OF THE INVENTION

Many devices and uses exist for which it is necessary to generate a high-energy electrical pulse. The spark ignition of a conventional internal combustion engine is possibly the best known such use. There are many other well established though less familiar applications for high-energy electrical pulses. For example, electrical discharge machining utilizes a stream of discrete electrical pulses to generate sparks across a gap filled with a non-conductive liquid between an electrode and a metal workpiece, thus eroding the workpiece to a desired shape. Pulse welding welds metals with the intense heat of electrical pulse discharges. Many furnaces and similar devices use electrical pulses to ignite a fuel and thus obtain greater efficiency over a steady burning process. The synthesizing processes for certain chemicals utilize electrical pulses. The list goes on and on.

Various conventional devices exist for generating electrical pulses, each sufficient for a certain class of applications. For example, a magneto coupled to a breaker circuit and high-voltage transformer has been used to generate the necessary ignition spark in small internal combustion engines. Larger engines, such as found in automobiles, typically use a battery in place of the magneto, and more modern engines have replaced breaker points with electronic switches.

Relatively low-energy electrical pulses can be generated entirely with integrated electronic circuitry, and various circuit designs exist for this purpose. As the required energy of the pulse increases, designing a suitable electronic module for pulse generation becomes increasingly difficult. It is possible to add discrete components such as capacitors and inductors to increase the energy of the pulse, but even such components have practical size and power limitations.

In addition to purely electronic pulse generators, there are various electro-mechanical devices which can be used to generate pulses. The magneto is a simple example of such an electromechanical device. In general, these devices convert some form of mechanical energy, such as the inertia of a rotating member, into electrical energy through the use of an electromagnetic field.

The generation of an electrical pulse may be viewed as a matter of concentrating electrical energy in a short time interval. An electronic device draws energy initially from a line voltage source or from a battery. Given sufficient time, an arbitrary amount of energy may be obtained. Similarly, an electromechanical device generally draws energy from the kinetic energy of a moving mass, which is converted to electrical energy. Given sufficient time, this too can supply an arbitrary amount of energy. Generating a pulse amounts to storing and discharging the energy in a sufficiently short time interval. The greater the energy storage required and shorter the time interval of discharge, the more demanding are the design constraints for an electrical pulse generator.

Although various conventional devices exist for the generation of electric pulses, there are yet potent needs for improved pulse generation devices. As in any apparatus, improvements might take the form of reduced cost of manufacture, higher reliability, lower energy consumption or operating cost, etc. But there is specifically a need for devices capable of supporting larger energy discharges, and/or which concentrate the discharge in shorter time intervals, than conventional pulse generators of comparable size, power input, and other characteristics.

Higher energy/shorter pulse electric pulse generators would have manifest utility as replacement for current pulse generators in any number of conventional applications. For example, a higher energy pulse generator used as an ignition source in an internal combustion engine might provide more complete fuel combustion, or greater ease of starting in cold or similar adverse conditions, or permit the use of alternative fuels, or operate more effectively in the presence of electronic noise, or free some other design constraint, so that the engine is made more fuel efficient, less costly to operate, more reliable, or in some other sense improved, over a comparable internal combustion engine using conventional spark ignition means. Similar observations can be made for many of the current conventional applications for electric pulse generators.

Even greater potential use for improved electric pulse generators could lie in applications which don't yet exist, or if they exist, exist only ephemerally in laboratories. Some applications of this variety have the aura of science fiction, yet it must be remembered that yesterday's science fiction has often become today's commonplace reality. At least part of the reason that many such potential applications have not yet achieved actual embodiment is that practical means for generating electrical pulses of sufficiently high energy and short duration are currently unavailable. An improved, high-energy pulse generator may provide the crucial link in the development of practical, working devices of this genre.

One example of such a futuristic application is the rail gun. A rail gun is a device which accelerates an object to a high speed using a very high-energy pulsed electromagnetic field. Although it is sometimes associated with military applications, it could be used various other purposes, such as launching satellites. Although theory says that such a device is possible, a practical, working device for, e.g. launching a small satellite, would require an electrical pulse of enormous energy, such as would be difficult or impossible to generate using conventional techniques.

Another such futuristic application may lie in the field of controlled nuclear fusion. Nuclear fusion requires a very high catalytic temperature, and at least some research has suggested that an electric pulse of sufficiently high energy and short duration might be used to help provide the necessary triggering conditions. Again, a pulse of this type would be difficult or impossible to generate using conventional techniques.

In sum, improved, more powerful, electric pulse generators could not only enhance the performance, cost or other characteristics of conventional devices which use pulse generators, such as spark ignition internal combustion engines, but open up entirely new frontiers only vaguely, if at all, imagined. Researchers in the field have not been ignorant of these needs, and a variety of proposed and implemented pulse generator designs have been produced. But existing designs have limitations that preclude a greater utility. A clear need exists for improved pulse generation techniques.

SUMMARY OF THE INVENTION

In accordance with the present invention, an electric pulse is generated by a moving multi-pole electromagnetic device in which the poles have a pseudo-random distribution, such that the poles periodically align. The device is capable of producing a brief pulse when the poles align, and at other times during the rotation produces little or no electrical output.

In the preferred embodiment, an equal number of poles exist on the rotor and stator, and all poles are equally sized and are spaced at equal circumferential intervals around the axis of rotation. However, unlike a conventional generator in which the polarity of poles alternates in a simple pattern, the polarity of the poles in accordance with the preferred embodiment varies in accordance with a pseudo-noise pseudo-random binary sequence function. At one point in the rotor's revolution, all rotor poles are aligned with corresponding stator poles to provide maximum net magnetic flux through the armature windings. At all other angular positions of the rotor, the rotor and stator poles are misaligned so that the net flux through the armature windings is small. In operation, rotation through the misaligned angular positions of the rotor produces essentially no flux change so that no electric power is generated. When the rotor reaches the aligned position, there is a sudden, large flux change which generates a high-energy electric pulse.

In the preferred embodiment, the pseudo-random distribution function assignment of polarity to the poles is accomplished according to a primitive polynomial spreading code "m-sequence". In this embodiment, the number of poles in each of the rotor and the stator is $(2^N-1)$, where N is a positive integer greater than 1. Both the rotor poles and the stator poles follow the same sequence. The primitive polynomial spreading code m-sequence has the property that it correlates to itself in only one cyclic phase and has almost no correlation in all other cyclic phases. Thus, as the rotor rotates through $(2^N-2)$ of the $(2^N-1)$ pole positions, the net flux through the windings is $(-1)$ units, where a unit is the flux produced by a single pair of aligned poles. I.e., there is virtually no correlation between rotor poles and stator poles ("pseudo-random") in these $(2^N-2)$ pole positions. In the remaining pole position, all the poles are aligned, and the net flux is $(2^N-1)$ units. Thus, there is a sudden, large flux change when the rotor reaches the aligned position.

Various alternative arrangements of coils and magnets are possible. In a first preferred embodiment, the rotor poles are permanent magnets of polarity assigned by the pseudo-random distribution function, while the stator poles are electromagnetic coils similarly assigned. In a second preferred embodiment, both the rotor poles and the stator poles are electromagnetic coils, the field winding being on the rotor, and the armature winding on the stator. In a third preferred embodiment, both the rotor and stator poles are electromagnetic coils, the armature winding being on the rotor and the field winding on the stator. In a fourth preferred embodiment, the stator poles are permanent magnets, while the rotor poles are electromagnetic coils.

In one alternative mode of operation, the drive field is provided by an electromagnetic coil driven by an AC source. At a relatively low rotational frequency, the device behaves like a pulsed or switched transformer in which most of the energy is supplied by the AC source, while at higher rotational frequencies the AC drive component is less significant.

In one exemplary application, a pulse generator in accordance with the preferred embodiment is used to generate an ignition spark for an internal combustion engine. However, many other potential applications are also possible.

An electric pulse generator constructed in accordance with the preferred embodiment of the present invention has the potential to generate a high-energy, short duration pulse beyond the capabilities of conventional pulse generators of comparable size and operating characteristics, and could be used in a variety of applications, now known or hereafter developed.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The invention described herein is a rotating electromagnetic device for generating an electrical pulse, and certain terms as used herein have the following meanings. The "rotor" is a physical member which rotates about an axis. The "stator" is a stationary member which does not rotate with respect to the axis. The "armature" is an electrical conductor in which a voltage is induced by a magnetic field which is time-varying with respect to the armature. Because it is typically wound in a coiled or looped fashion, the armature is sometimes also referred to as the "armature winding" or "armature coil", it being understood that this is not meant to imply any particular geometry of the electrical conductor which forms the armature. The armature may be located either on the rotor or on the stator. The magnetic field which drives the armature may in fact be a stationary, non-varying field, which is "time-varying with respect to the armature" only because the armature is rotating. The "field winding" or "field coil" is an electrical conductor which generates the magnetic field for driving (i.e., inducing voltage in) the armature. As in the case of the armature, the use of the words "winding" or "coil" are not meant to imply any particular geometry of the field winding. The magnetic field which drives the armature may be generated by a field winding, or by permanent magnets. The field winding or the permanent magnets may be located either on the rotor or the stator, but are not on the same component as the armature. I.e., if the armature is on the rotor, then the field winding or permanent magnets, as the case may be, are on a different component such as the stator, and vice-versa.

Figure 1:
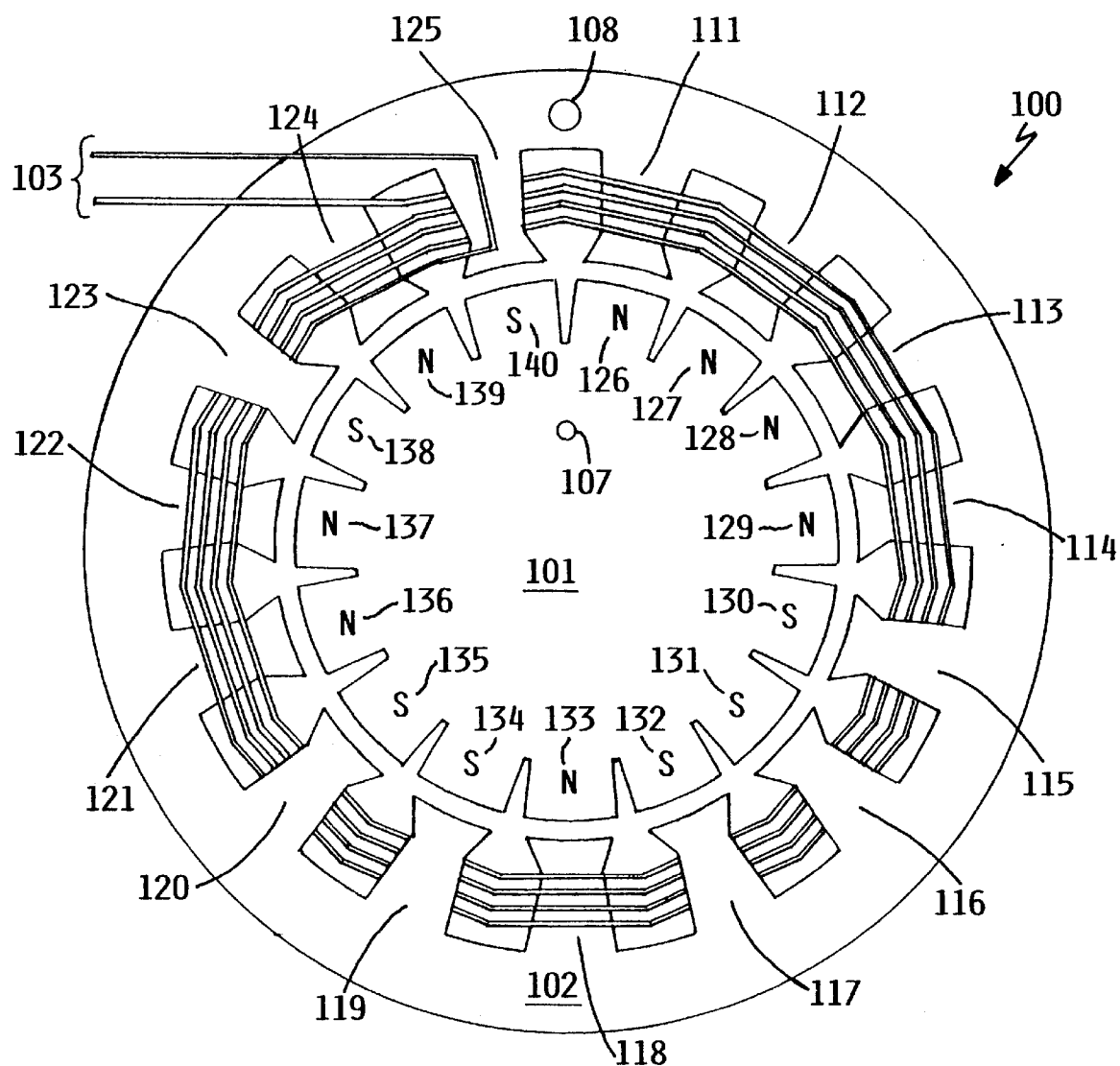
FIG. 1 is a simplified cross-sectional representation of a rotating electromagnetic device for generating an electric pulse, according to a preferred embodiment of the present invention.

Referring to the Drawing, wherein like numbers denote like parts throughout the several views, FIG. 1 is a simplified cross-sectional representation of a rotating electro-magnetic device 100 for generating an electric pulse, according to one version of the preferred embodiment of the present invention. Pulse generator 100 comprises a rotating member (rotor) 101 and a stator 102. In FIG. 1, pulse generator 100 is shown in a cross-section perpendicular to the axis of rotation of rotor 101. In the representation of FIG. 1, rotor 101 contains multiple equally circumferentially spaced permanent magnet poles 126–140 which provide a driving field, while stator 102 contains an equal number of equally circumferentially spaced electromagnetic coil poles 111–125 which form an armature which is driven by the magnetic field of the rotor. An external mechanical power source (not shown) rotates the rotor to provide kinetic energy to the rotating mass, a portion of which is eventually converted to electrical energy by generator 100. This mechanical power source could be, e.g., an electric motor, an internal combustion engine, a hydraulic turbine, or any of numerous mechanisms for rotating a rotor. Configurations of field and armature coils and magnets other than those shown in FIG. 1 are possible, as discussed in greater detail herein. Unless clearly limited by the context, reference number 100 herein includes pulse generators employing any of these variations of field and armature coils and magnets.

As shown in FIG. 1, rotor 101 contains fifteen permanent magnet poles 126–140, eight of which 126, 127, 128, 129, 133, 136, 137, 139 are North ("N") opposing the stator, while seven 130, 131, 132, 134, 135, 138, 140 are South ("S") opposing the stator. Stator likewise contains fifteen electromagnetic coil poles 111–125. Eight of these 111, 112, 113, 114, 118, 121, 122, 124 are represented in FIG. 1 with the coil wires superimposed over the core, while seven 115, 116, 117, 119, 120, 123, 125 are represented with the coil wires hidden under the core. By convention, this representation is used to designate poles having a positive flux through the stator winding in the presence of a North rotor pole and a negative flux through the stator winding in the presence of a North rotor pole, respectively (herein called positive flux and negative flux poles, respectively). However, it will be understood that FIG. 1 is merely intended as a simplified representation of the stator windings for illustrative purposes, and that in fact the windings are 3-dimensional and in physical appearance may be quite different from the representation of FIG. 1, that a substantial part of the windings may run parallel to the axis, and that the windings would typically contain a larger number of turns than represented in FIG. 1. What is unusual about the generator of the preferred embodiment is not the materials used to construct the stator and rotor or the shape or manner in which wires are wound on the stator, but the sequence of pole polarities. Therefore, it is expected that any of various conventional materials and designs used for core and windings would be appropriate for the electric pulse generator of the preferred embodiment, or alternatively, that materials or design techniques hereafter developed could be adapted to the invention described herein.

All of the stator (armature) pole windings 111–125 are logically connected in series as a single electrical conductor having two output leads 103, at which the generated voltage pulse appears. The windings are not necessarily physically coupled to immediately adjacent poles. I.e., depending on the physical shape of the core and windings, and other design factors, it may be preferable to connect adjacent poles 111 to 112 to 113 and so on sequentially in series. On the other hand, it may be preferable to use some other arrangement, such as alternating poles of different polarity in series, so that a sequence of poles something like 111–125–112–115–113, etc. is connected in series.

In accordance with the preferred embodiment, the polarity of poles on the rotor and stator correspond to a pseudo-noise pseudo-random function distribution. This is a periodic function which has the characteristic that, when phase shifted, it is orthogonal to itself (it does not correlate with itself) at any point except when phase shifted a full integral number of periods or cycles. The identical function is used to allocate the polarity of poles on both the rotor and the stator. Thus, when the rotor and stator are aligned at the same point of the allocation function, there is perfect correlation of the poles, and at all other locations during the revolution of the rotor, there is virtually no correlation between the rotor poles and the stator poles. This phenomenon is explained more fully below and can be visualized in FIGS. 1, 2A and 2B.

A pair of alignment marks 107, 108 appear on the rotor and stator, respectively. As represented in FIG. 1, the rotor is in the aligned position. It will be observed that in this position, every North pole of rotor 101 (i.e., poles 126, 127, 128, 129, 133, 136, 137 139) is aligned with a respective positive flux stator pole (i.e., poles 111, 112, 113, 114 118, 121, 122, 124). Every South pole of rotor 101 (i.e., poles 130, 131, 132, 134, 35, 138, 140) is aligned with a respective negative flux stator pole (i.e., poles 115, 116, 117, 119, 120, 123, 125). The stator poles being connected in series, the net flux through the stator as a whole is the sum of flux in the individual poles. If the flux in an individual stator pole is arbitrarily designated as one unit, then the net flux in the aligned position is the sum of the positive flux stator poles aligned with North rotor poles (each of which is +1 unit) and the negative flux stator poles aligned with South rotor poles (each of which is also +1 unit), giving a total net flux of +15 units.

Figure 2A:
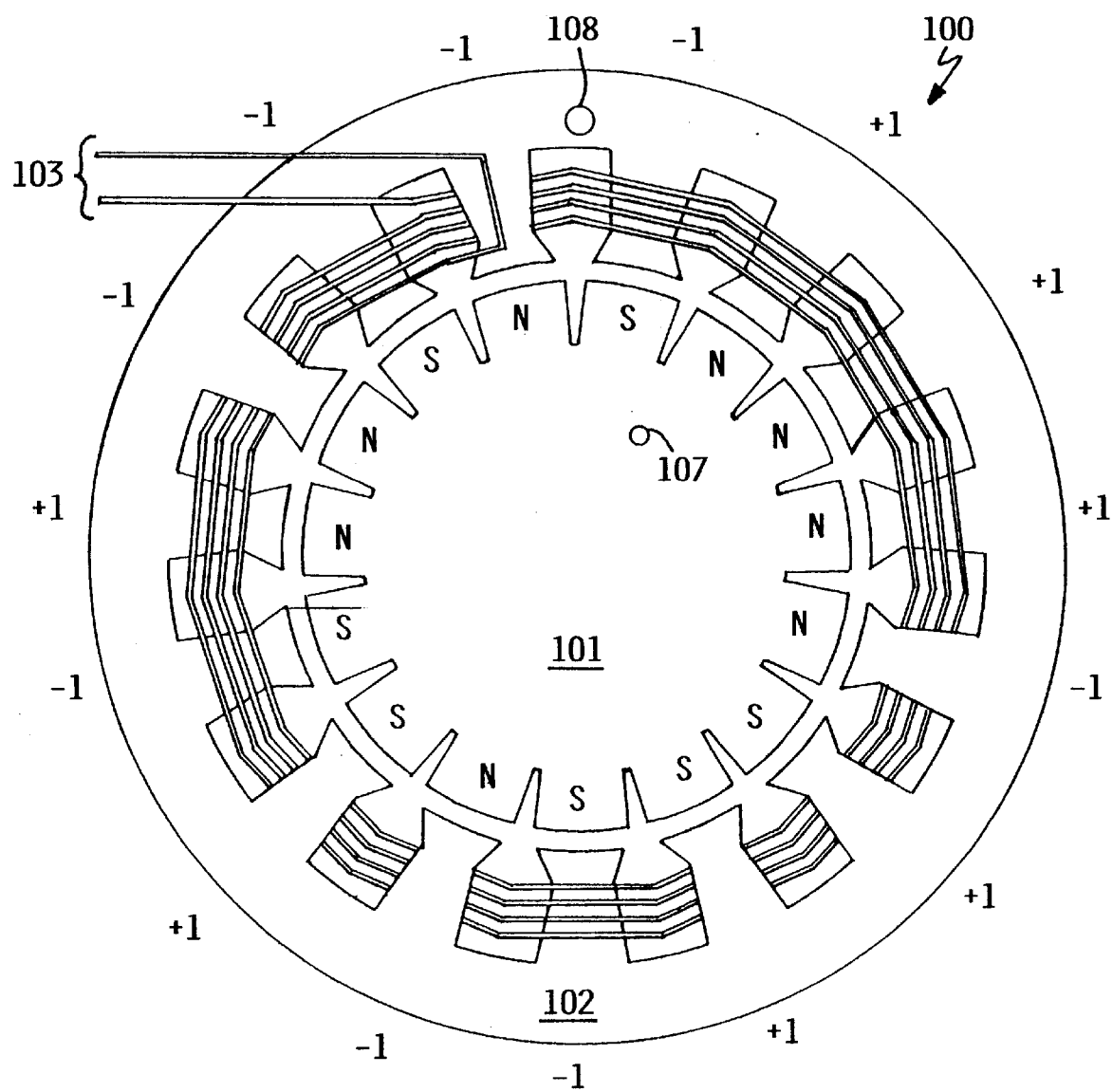
FIG. 2A is a cross-sectional view of the electric pulse generator of the preferred embodiment, in which the rotor has been rotated one pole clockwise with respect to the view of FIG. 1.

FIG. 2A is a cross-sectional view of the electric pulse generator 100 of FIG. 1, in which rotor 101 has been rotated one pole clockwise (from the perspective looking into the drawing) with respect to the view of FIG. 1. In this position, the poles are not aligned, and it will be observed that alignment marks 107, 108 are not adjacent each other, as they are in FIG. 1. Unlike the aligned position of FIG. 1, in the position of FIG. 2, some of the North poles on rotor 101 are aligned with positive flux stator poles, while others are aligned with negative flux stator poles. The same is true of the South poles on rotor 101. If the flux through a positive flux stator pole is +1 unit in the presence of a North pole on the rotor, then it is −1 unit in the presence of a South pole on the rotor, and conversely for negative flux stator poles. The flux at each individual stator pole is identified as either +1 or −1 units, as shown in FIG. 2A. I.e., beginning at alignment mark 108 and proceeding clockwise, the first stator pole is a positive pole opposite a South pole on the rotor, giving a flux of −1. The second stator pole is also a positive pole, but opposite a North pole on the rotor, giving a flux of +1. The third and fourth poles are positive and North, giving a flux of +1 each. The fifth pole is negative and North, giving a flux of −1. The sixth and seventh poles are negative and South, giving flux of +1 each. And so on, for all poles around the stator. Since the stator poles are connected in series, the net flux through the stator 102 is the sum of the flux in the individual poles. In the position of FIG. 2A, this sum is −1 unit.

Figure 2B:
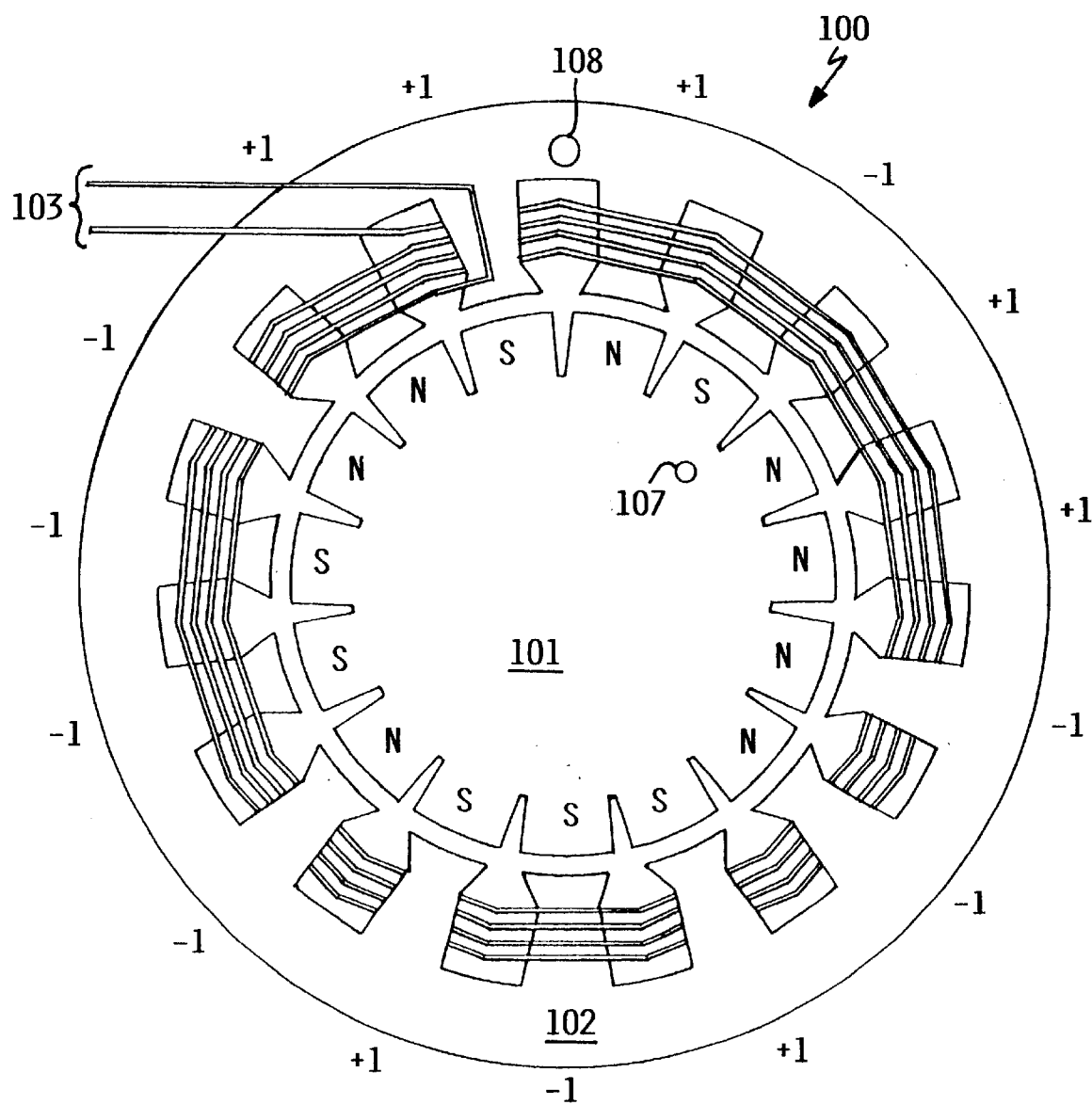
FIG. 2B is a cross-sectional view of the electric pulse generator of the preferred embodiment, in which the rotor has been rotated two poles clockwise with respect to the view of FIG. 1.

FIG. 2B is a another cross-sectional view of the electric pulse generator 100 of FIG. 1, in which rotor 101 has been rotated two poles clockwise (from the perspective looking into the drawing) with respect to the view of FIG. 1. Again, the poles are not aligned, as shown by the relative positions of alignment marks 107, 108. The analysis performed above with respect to FIG. 2A can be repeated for FIG. 2B. The flux through each individual stator pole is shown as either +1 or −1 unit in FIG. 2B. Although the sequence of +1 and −1 unit fluxes is not the same as that of FIG. 2A, indicating that for some stator poles, the flux has changed from +1 to −1 or vice versa, the total net flux through the stator, i.e., the sum of the individual pole fluxes, is still the same as that of FIG. 2A, i.e. −1 unit.

The analysis depicted in FIGS. 2A and 2B can be continued for all 14 non-aligned pole positions of rotor 101. It will be observed that, with the exception of the aligned position, for all discrete locations in which rotor poles are directly opposing stator poles, the net flux through the stator is −1 unit, even though the flux in individual stator poles may change with different positions of the rotor.

Furthermore, between any adjacent discrete rotor positions in which the total net stator flux is −1 (e.g., between positions shown in FIGS. 2A and 2B), the stator flux remains essentially constant at any intermediate location as the rotor rotates from one of the positions to the other. Flux through some stator poles does not change, flux through other poles changes from +1 to −1, and flux through still others changes from −1 to +1. The number of positive to negative changes is exactly the same as the number of negative to positive changes, and since the poles and windings are essentially symmetrical, the flux remains constant while rotating through the short arc. However, as the rotor rotates from a pole position adjacent the aligned position to the aligned position shown in FIG. 1, there is a sudden and dramatic change in total net flux from −1 to +15, and this drops off again as the rotor rotates past the aligned position.

Figure 3:
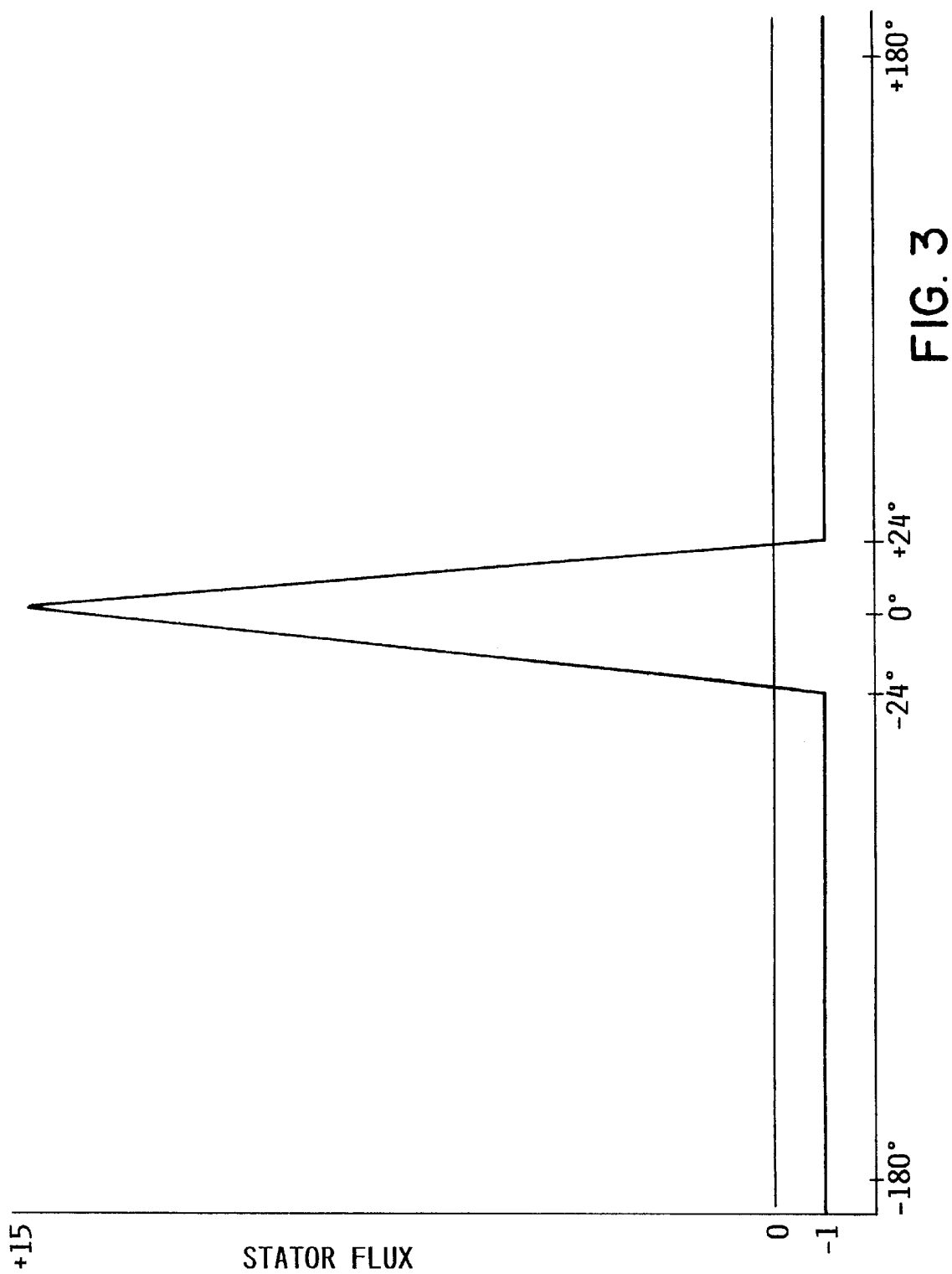
FIG. 3 is an idealized plot of total net stator flux as a function of angular position of the rotor under open circuit conditions, for the electric pulse generator of the preferred embodiment.

One may therefore plot the total net flux through the stator as a function of the angular position of the rotor, realizing that this is a periodic function which repeats with every revolution of the rotor. FIG. 3 is such a plot under idealized, open circuit, conditions. Referring to FIG. 3, it will be observed that stator flux remains a constant −1 unit through most of the rotor's angular rotation, and that there is a sudden spike to +15 units beginning just after the pole position immediately adjacent the aligned position (i.e., −24°), peaking at the aligned position (0°), and just as rapidly declining to −1 at the next pole position (+24°). The flux "units" shown in FIG. 3 are multiples of the flux of an individual stator pole as stated earlier. This flux will depend on the geometry of the stator and rotor, number of coil turns, strength of the rotor magnet, and various other design details.

Figure 4:
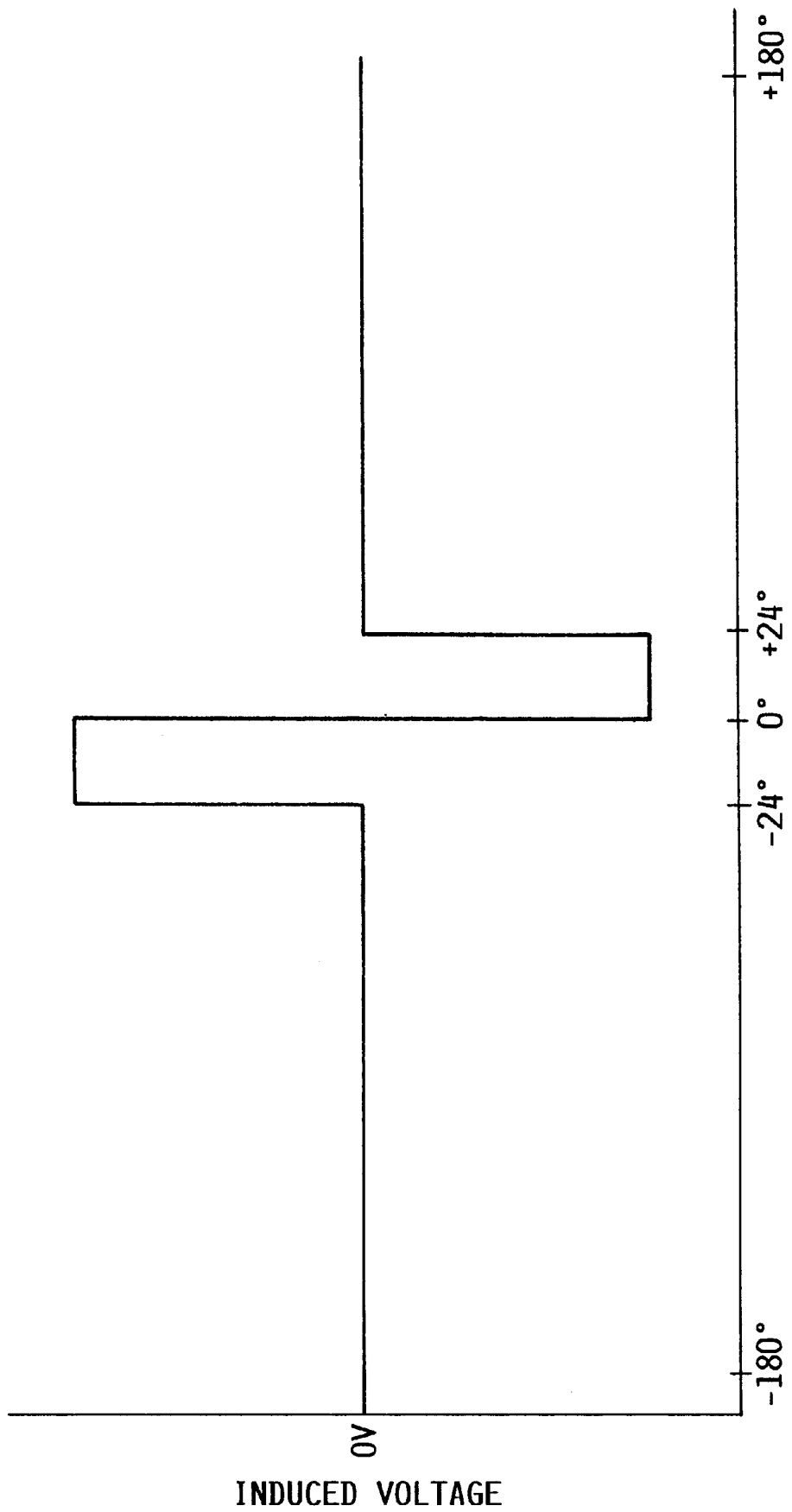
FIG. 4 is an idealized plot of stator voltage as a function of angular position of the rotor under open circuit conditions, for the electric pulse generator of the preferred embodiment.

A time-varying magnetic field induces a voltage in the stator (armature) coils. By referring to FIG. 3, the voltage induced in the stator may be plotted as a function of angular position of the rotor as the rotor rotates in a complete revolution at a constant speed. FIG. 4 is such a plot, again under idealized, open circuit conditions. As shown in FIG. 4, induced voltage during most of the rotor's revolution is 0, this being a consequence of the fact that flux in the stator coils is constant. As flux in the stator begins to change rapidly starting at the pole position immediately adjacent the aligned position (−24°), an induced voltage pulse is generated in the stator. The pulse is shown in FIG. 4 as a positive voltage, but it could just as easily be a negative voltage, depending on the orientation. As the rotor crosses the aligned position, flux begins to rapidly decline. The declining flux induces a voltage pulse of approximately equal magnitude and opposite polarity as the previously induced pulse. FIG. 4 is intended to illustrate the characteristic profile of armature voltage in a general sense, and the plot is therefore unitless; the actual voltage induced will depend on the strength of the magnetic field, the number of coils, speed of the rotor, and so forth.

Although 15 poles are shown on each of the rotor and stator in the generator embodiment of FIG. 1, it will be appreciated that the number of poles may vary. If one assumes that, at the aligned position of the rotor, all stator poles are driven in the same direction by corresponding rotor poles, then the net flux at the aligned position is M units, where M is the number of poles. As shown in FIG. 3, the magnetic flux rises from a low value (−1 unit in the case of the arrangement of FIG. 1) to M units over the angular distance between two poles, i.e. (360°/M). Therefore, in general one may say that, the greater the number of poles, the narrower and steeper will be the magnetic flux rise. Consequently, all other things being equal, the greater the number of poles, the higher will be the generated voltage pulse.

It will be understood that FIGS. 3 and 4 are idealized, open circuit representations of magnetic flux and induced voltage, which are presented here to illustrate the generator's principle of operation from a conceptual standpoint. Under actual operating conditions with a real physical device, the plots may look somewhat different. Where the generator is coupled to a load, the load impedance will affect the plots. This load impedance will not necessarily be linear; e.g., where the generator is used to create an ignition spark in an air gap, ionization of the gas in the gap will change the load impedance. In general, it may be expected that as the rotor approaches the aligned position, magnetic flux will initially attempt to maintain the previously established paths, and only when very near the aligned position will flux be forced into the driving paths for inducing a voltage. This phenomenon may have the effect of making the flux spike even steeper and narrower than would be predicted for ideal conditions, possibly increasing the magnitude and decreasing the duration of the induced voltage pulse. However, the actual shape of plots and values of voltage produced are dependent on so many individual factors that it would be difficult to generalize.

The poles according to the preferred embodiment being of equal size and construction characteristics, a pulsed effect is accomplished by assigning polarity in a pseudo-random manner to produce a pulse at one rotor aligned location, and to induce virtually no voltage at other rotor locations. There are many possible alternative methods for assigning polarity in a pseudo-random manner which will achieve the desired effect.

Specifically, there are a group of pseudo-random functions known as pseudo-noise codes. These are binary sequences that exhibit random noise-like properties. However, they inherently or deliberately exhibit periodicity. Such pseudo-noise codes are used in spread spectrum communications systems, such as data channels, cell phones, cordless phones, global positioning systems, and so forth. However, they are not conventionally applied to pole assignments in electric generators.

In the preferred embodiment, a binary pseudo-noise code sequence is used to assign polarity to the poles of the stator and rotor. I.e., beginning at an index point and continuing from pole to pole circumferentially around the rotor (or around the stator), each pole is assigned a polarity corresponding to a "1" or "0" in the binary sequence. I.e., in the case of a permanent magnet pole, a "1" might correspond to North, while a "0" corresponds to South. In the case of a coil, a "1" would correspond to a winding in a first direction relative to the flux path, while a "0" would correspond to the opposite direction. The correspondence relationship may be arbitrary, so long as it is consistently applied.

The same sequence is used to assign polarity for both the rotor and the stator. Because the same sequence is used, the poles of the rotor and stator inherently have perfect correspondence when they are aligned at the index point (herein referred to as the aligned location). However, at all other locations, the sequence of pole assignments takes on the appearance of noise. I.e., there is no apparent correlation between the poles of the rotor and the poles of the stator. While a truly random assignment of poles may cause some locations in which there was a weak correlation between the poles (and hence a small change in net flux as the rotor rotates from one pole position to the next), it is possible to construct pseudo-random sequences, specifically pseudo-noise sequences, in which the correlation between phase-shifted sequences is always zero, and there is a constant net flux at all the pole positions, other than the aligned position.

The specific pseudo-noise code sequence employed in the preferred embodiment is a maximum-length sequence ("m-sequence") based on primitive polynomials, it being understood that other pseudo-noise code sequences could be used, or that other pseudo-random functions might also provide suitable polarity assignments. An m-sequence has a length of $(2^N-1)$, where N is a positive integer, and hence the number of stator poles, as well as the number of rotor poles, is preferably chosen to be $(2^N-1)$. N=1 is the degenerate case of a single pole, and so we assume that N will be greater than 1. The primitive polynomials for degrees of 2, 3, 4, 5 and 6 are shown below in Table 1:

TABLE 1

| Degree | Primitive Polynomial(s) |
| --- | --- |
| 2 | $X^2 + X + 1$ |
| 3 | $X^3 + X^2 + 1$ |
|   | $X^3 + X + 1$ |
| 4 | $X^4 + X^3 + 1$ |
|   | $X^4 + X + 1$ |
| 5 | $X^5 + X^4 + X^3 + X^2 + 1$ |
|   | $X^5 + X^4 + X^3 + X + 1$ |
|   | $X^5 + X^4 + X^2 + X + 1$ |
|   | $X^5 + X^3 + X^2 + X + 1$ |

TABLE 1-continued

| Degree | Primitive Polynomial(s) |
| --- | --- |
|   | $X^5 + X^3 + 1$ |
|   | $X^5 + X^2 + 1$ |
| 6 | $X^6 + X^5 + X^4 + X + 1$ |
|   | $X^6 + X^5 + X^3 + X^2 + 1$ |
|   | $X^6 + X^5 + X^2 + X + 1$ |
|   | $X^6 + X^4 + X^3 + X + 1$ |
|   | $X^6 + X^5 + 1$ |
|   | $X^6 + X + 1$ |

In general, the number of primitive polynomials that exist for a specific degree becomes larger as the degree increases. For degree 7, there are 18 such primitive polynomials. There are 16 for degree 8, and 48 for degree 9. Additional polynomials exist at higher degrees.

The primitive polynomial used to generate the sequence of poles illustrated in FIG. 1 is a degree 4 polynomial (N=4, meaning the number of poles is $2^N-1$, or 15), and specifically is $X^4+X+1$. If this primitive polynomial is set equal to 0 and rearranged in Boolean algebra, we have the equation:

$$X^4 = X+1 (= X^1 + X^0) \tag{1}$$

Figure 5:
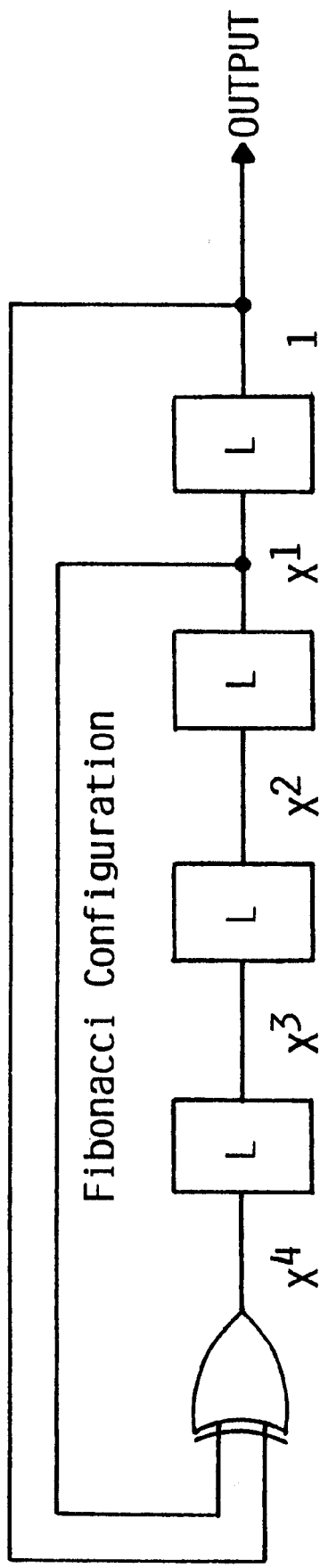
FIG. 5 shows a Fibonacci configuration of a linear feedback shift register which can generate an m-sequence used for allocating polarity of generator poles, according to the preferred embodiment.

A cyclic sequence of ones and zeroes can be generated using a Fibonacci configuration a linear feedback shift register (LFSR), each degree of the polynomial representing an output of a corresponding latch (i.e, a different phase of the cyclic signal sequence). Such a Fibonacci configuration of an LFSR for equation (1) (i.e., for the polynomial $X^4+X+1$) is shown in FIG. 5. An appropriate Fibonacci configuration of an LFSR could be constructed for any primitive polynomial. The sequence thus generated is an "m-sequence".

For any arbitrary initial set of values in the latches of FIG. 5 (other than the degenerate case of all zeroes), the sequence of values produced by the latches will be cyclic. For example, for the initial set of latch values 1,1,1,1 (i.e., $X^3=X^2=X^1=X^0=1$), $X^4$ will be 0, meaning that on the next phase of the sequence, the latches will hold the values 0,1,1,1. This process can be continued as shown in Table 2.

TABLE 2

| Phase | $X^3$ | $X^2$ | $X^1$ | $X^0$ |
| --- | --- | --- | --- | --- |
| 0 | 1 | 1 | 1 | 1 |
| 1 | 0 | 1 | 1 | 1 |
| 2 | 0 | 0 | 1 | 1 |
| 3 | 0 | 0 | 0 | 1 |
| 4 | 1 | 0 | 0 | 0 |
| 5 | 0 | 1 | 0 | 0 |
| 6 | 0 | 0 | 1 | 0 |
| 7 | 1 | 0 | 0 | 1 |
| 8 | 1 | 1 | 0 | 0 |
| 9 | 0 | 1 | 1 | 0 |
| 10 | 1 | 0 | 1 | 1 |
| 11 | 0 | 1 | 0 | 1 |
| 12 | 1 | 0 | 1 | 0 |
| 13 | 1 | 1 | 0 | 1 |
| 14 | 1 | 1 | 1 | 0 |

At phase 15, the set of values would return to 1,1,1,1, which are the same as the values for phase 0, and thus the cycle would simply repeat.

It will be observed that the same sequence of ones and zeroes cycles through each latch, although at a different phase. This m-sequence contains 15 values, and repeats itself indefinitely after the last value. The m-sequence is:

$$1,1,1,1,0,0,0,1,0,0,1,1,0,1,0 \tag{2}$$

Referring to rotor 101 in FIG. 1, if a "1" in m-sequence (2) above corresponds to "North", and a "0" corresponds to "South", it will be observed that m-sequence (2) precisely corresponds to the sequence of rotor poles 126–140, beginning at alignment mark 107 and proceeding clockwise. Furthermore, if a "1" in m-sequence (2) above corresponds to a stator pole having a positive flux through the stator winding in the presence of a North rotor pole, and a "0" corresponds to a stator pole having a negative flux through the stator winding in the presence of a North rotor pole, then m-sequence (2) precisely corresponds to the sequence of stator poles 111–125, beginning at alignment mark 108 and proceeding clockwise.

Since an m-sequence is cyclic, it may exist as any of multiple phase-shifted versions. For example, the sequence:

$$0,0,1,0,0,1,1,0,1,0,1,1,1,1,0 \qquad (3)$$

is just a phase-shifted version of m-sequence (2) above. One of the characteristics of an m-sequence is that any phase version of the sequence is virtually orthogonal to any other version of the same sequence of a different phase. Put another way, there is virtually no correlation between the individual elements of an m-sequence and a phase-shifted version of the same m-sequence. Of course, at the same phase, the individual elements of an m-sequence correlate perfectly with each other.

In mathematical terms, this orthogonality, or lack of correlation, between different phase versions of the same m-sequence, can be expressed by converting the zeroes in the sequence to −1, and taking the dot product of any two sequences. It will be observed that, for any pair of sequence terms which have positive correlation (either both terms are 1 or both terms are −1), the corresponding dot product term is 1, while for any pair of sequence terms which have negative correlation, the corresponding dot product term is −1. Since the values are binary, a pair of random sequences should give an equal number of positive correlating terms of the dot product and negative correlating terms, i.e., an equal number of 1's and −1's in the terms of the dot product. The dot product of two random sequences should therefore be about 0. If one performs this exercise with m-sequence (2) and its phase-shifted version (3), the dot product is:

$$1x-1+1x-1+1x1+1x-1+-1x-1+-1x1+-1x1+1x-1+-1x1+-1x-1+ \\ 1x1+1x1+-1x1+1x1+-1x-1=-1$$

For an odd number of sequence terms, it is impossible to have a dot product of 0, but −1 is sufficiently close that for all practical purposes we can say there is no correlation. If the same dot product is computed for every possible pair of phase versions of m-sequence (2), one will discover that the dot product is always −1, except where the pair includes two versions of identical phase, in which case the dot product is 15. Put another way, if M is a 15×15 matrix whose rows are the different phase shifted versions of m-sequence (2) expressed as 1's and −1's, then the matrix product of M and its transpose ($M \cdot M^T$) is a matrix all of whose elements are −1, except along the main diagonal, where the elements are 15. Moreover, the same relationship holds for all m-sequences, the value along the diagonal being the number of elements in the m-sequence.

Translated into physical terms with reference to an electric generator, these mathematical relationships mean that if poles of a rotor and a stator are assigned polarity according to identical m-sequences, then the poles will perfectly correlate (align) at one point in the revolution of the rotor, and at all other locations will have no correlation. The alignment point corresponds to the point of maximum net flux in the armature, which will cause a large pulse as the rotor rotates past this point. Since all other points have essentially no correlation, and hence the same low value of net flux, there is no flux change as the rotor rotates through these points and no voltage is produced. Thus, any m-sequence could be used to assign polarity of poles in an electric pulse generator. This relationship is useful for varying the number of poles. An appropriate m-sequence can be constructed for any number of poles equal to ($2^N-1$), where N is a positive integer. Thus, if it is desirable to construct a generator having a greater number of poles or a lesser number of poles than the 15 poles of the exemplary generator shown in FIG. 1, various other numbers of poles could be supported with m-sequence assignments.

Although m-sequences are used for polarity assignment in the preferred embodiment due to their near perfect orthogonality for all phases of the sequence other than two identical phases, an electric generator in accordance with the present invention would not have to use a polarity assignment corresponding to an m-sequence, and other pseudo-noise code sequences might alternatively be used. One drawback in particular of the m-sequence is that the number of poles must be ($2^N-1$) for N an integer. There may be design reasons for choosing a different number of poles, for which an m-sequence can not be constructed, or there may be other reasons for choosing a different pseudo-random sequence for polarity assignment. For example, so-called Barker codes (which are another form of cyclic pseudo-noise code) might also provide suitable polarity assignments in some applications. Another alternative is to use only a portion of the cycle of a longer pseudo-noise code, such as an m-sequence where ($2^N-1$) is larger than the number of poles desired. Furthermore, a pseudo-random sequence for assignment of polarity in accordance with the present invention need not follow any known pseudo-noise code sequence, and may be a sequence developed specifically for this application, or a sequence according to some different mathematical formula now known or hereafter developed. Although usually desirable, it is not strictly necessary that the generator have absolutely no electrical output at all non-aligned rotor positions, and a small flux variation from one pole position of the rotor to the next (inducing a small electrical output) may be acceptable for certain applications.

Alternative Generator Configuration Examples

The generator 100 of FIG. 1 represents one embodiment of the present invention, in which the driving magnetic field is provided by a set of permanent magnets mounted on rotor 101, which is set inside and surrounded by a stationary armature (stator 102). However, those skilled in the art will recognize that many variations in the design and placement of rotor, stator, magnetic field apparatus, and armature are possible. Several such alternative embodiments are described below, it being understood that these alternative embodiments are described by way of example of possible variations, that many other variations exist, and that the examples explicitly described herein are by way of illustration and not by way of limitation.

In general, it may be said that a magnetic field apparatus is anything that provides a driving magnetic field. Typically, this would be provided by either a set of permanent magnets or an electromagnetic coil or coils arranged as multiple poles. The coil is normally arranged with the poles in series, although they could be in parallel. The coil would typically be driven by a DC source, although it might be switched or pulsed. It might even be driven by an AC source, as further discussed below. Each pole of the coil typically surrounds a magnetic core material to provide a flux path. In the case of a coil driven by a DC source, the magnetic core would typically be a solid electrically conducting material such as iron to use the eddy current effect to maximum advantage.

The armature is a conductor which is driven by the magnetic field apparatus. Typically, the armature is constructed as multiple coil windings around a laminated magnetic core or a solid magnetic core made of a non-electrically conducting material, in order to minimize eddy current losses. For example, the armature core might be multiple laminated silicon steel sheets, built up to an appropriate thickness. The armature poles are normally connected in series to provide maximum generated voltage, although they might be connected in parallel.

The magnetic field apparatus and the armature necessarily have to rotate with respect to each other in order to generate electricity, but either element may be the rotating element. I.e., the armature may be mounted on the stator, with the magnetic field apparatus on the rotor (as in the embodiment of FIG. 1), or the magnetic field apparatus may be mounted on the stator, with the armature on the rotor. It would even be possible to mount each element on a separate rotor, the two rotors rotating with respect to each other, possibly in opposite directions; however, such a design introduces complexities that would not appear to be justified, except possibly in unusual applications.

Typically, the stator surrounds and virtually encloses the rotor, as shown in the embodiment of FIG. 1. This design is often mechanically simpler, since the rotor can be mounted directly on a rotatable shaft, and the moving rotor is inherently shielded by the stator from mechanical interference. However, it is possible, and in many applications it is desirable, to instead mount the stator adjacent the axis of rotation, and mount the rotor surrounding the stator. Furthermore, the rotor and stator need not be concentric cylinders as depicted in FIG. 1. A rotor and stator may be disk-shaped (and in fact may be interleaved disks), or could be any number of alternative geometries.

For example, with reference to the generator 100 of FIG. 1, in the discussion above the inner cylindrical member has been designated the rotor 101, and the outer cylindrical member has been designated the stator 102. However, it would be possible for the outer member (armature) to be the rotor and the inner member the stator. It would additionally be possible to mount the permanent magnet poles constituting the magnetic field apparatus on the outer member (which could be either a rotor or stator), and the winding constituting the armature on the inner member.

Figure 6:
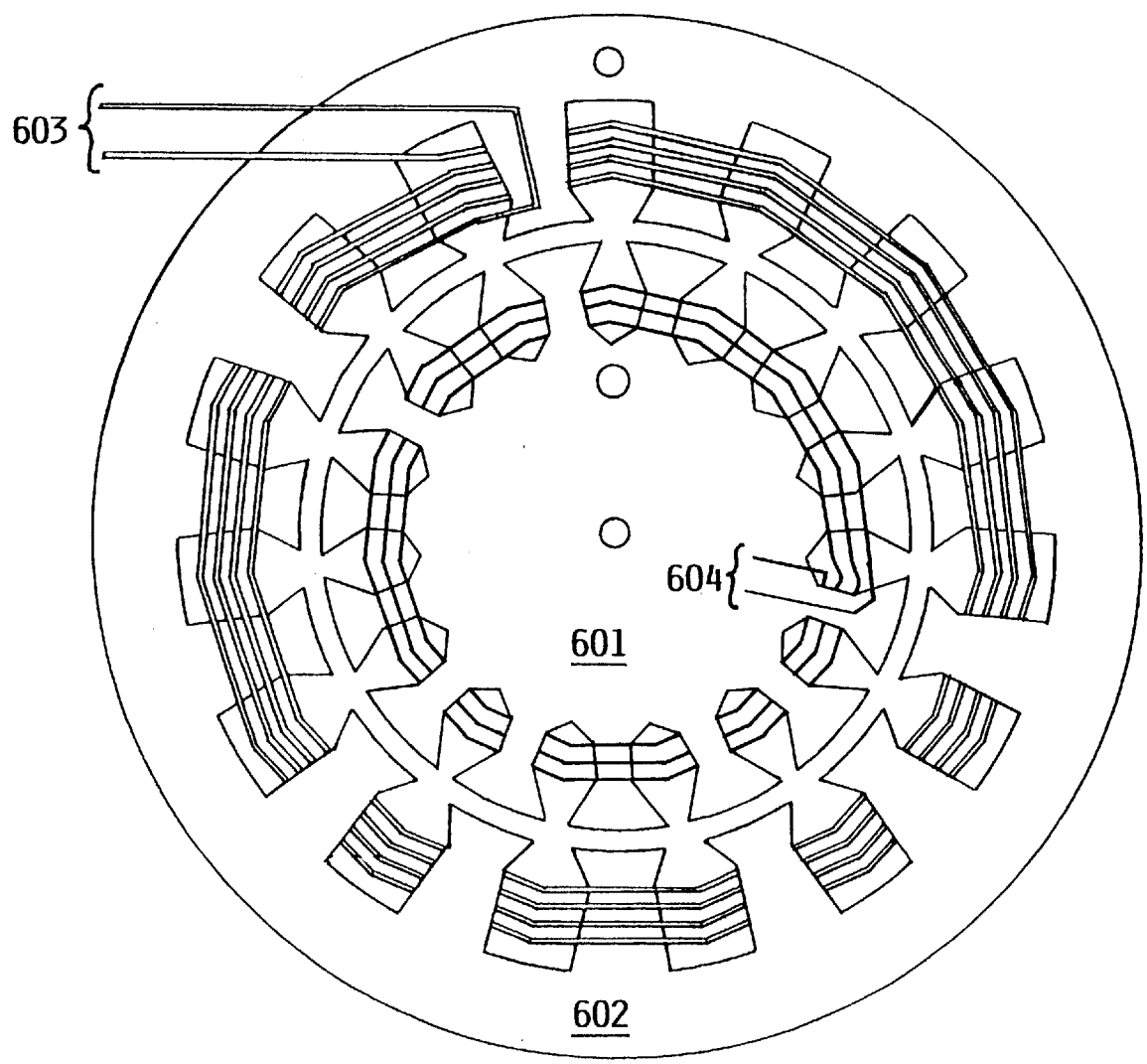
FIG. 6 is a simplified cross-sectional representation of a rotating electro-magnetic device for generating an electric pulse, according to a first set of alternative versions of the preferred embodiment.

FIG. 6 provides an illustration of certain additional alternative generator configurations. Like FIG. 1, FIG. 6 is a simplified cross-sectional representation, shown in a cross-section perpendicular to the axis of rotation. As shown in FIG. 6, an inner cylindrical member 601 contains multiple equally circumferentially spaced electromagnetic coil poles 626–640, while an outer cylindrical member 602 contains an equal number of equally circumferentially spaced electromagnetic coil poles 611–625. A conductive winding with two lead wires 603 connects the coil poles of outer cylindrical member 602 in series, and a second conductive winding with two lead wires 604 connects the coil poles of inner cylindrical member 601 in series. Conductive winding 603 is wrapped around a magnetic core structure of outer member 602, and conductive winding 604 is wrapped around a magnetic core structure of inner member 601.

Thus far in the description of FIG. 6, the terms "stator", "rotor", "armature" and "field coil" have been avoided, and for a very good reason. Inner cylindrical member 601 could be either a stator or a rotor, and could be either an armature or a field coil, and could be any combination of these. The same is true for outer cylindrical member 602.

Specifically, in a first alternative embodiment, member 601 is a rotor which acts as the magnetic field coil apparatus, and member 602 is a stator which acts as the armature. In this first alternative embodiment, a drive current (preferably DC) is provided to leads 604 to generate a magnetic field in the poles of member 601, the rotation of member 601 rotates the field with respect to member 602 (the armature), and the rotating field induces a pulse in the output of the windings 603 of member 602.

In a second alternative embodiment, member 601 is a rotor which acts as the armature, and member 602 is a stator which acts as the magnetic field coil apparatus. In this second alternative embodiment, a drive current (preferably DC) is provided to leads 603 to generate a stationary magnetic field in the poles of member 602, the rotation of member 601 rotates the armature with respect to this stationary field, and the rotation induces a pulse in the output of the windings 604 of member 601.

In a third alternative embodiment, member 601 is a stator which acts as the magnetic field coil apparatus, and member 602 is a rotor which acts as the armature. In this third alternative embodiment, a drive current (preferably DC) is provided to leads 604 to generate a magnetic field in the poles of member 601, the rotation of member 602 rotates the armature with respect to this stationary magnetic field, and the rotation induces a pulse in the output of the windings 603 of member 602.

In a fourth alternative embodiment, member 601 is a stator which acts as the armature, and member 602 is a rotor which acts as the magnetic field coil apparatus. In this fourth alternative embodiment, a drive current (preferably DC) is provided to leads 603 to generate a magnetic field in the poles of member 602, the rotation of member 602 rotates the magnetic field with respect to member 601 (the armature), and the rotating field induces a pulse in the output of the windings 604 of member 601.

The preferred construction of magnetic core structures for outer member 602 and inner member 601 will depend on the function of the respective members, i.e., whether they function as armatures or field coils. The armature (whether rotor or stator, whether member 601 or 602) experiences a sharp change in current, and it is therefore preferable to use a laminated core (such as thin sheets of silicon steel) or a non-electrically conductive core material to minimize eddy current losses. The field coil (whether rotor or stator, whether member 601 or 602) is preferably driven by DC current, and therefore a solid, electrically conductive core material is preferred. However, in those applications in which the field coil is also driven by a time-varying current, a laminated or non-electrically conductive core material for the field coil may alternatively be preferred.

Figure 7:
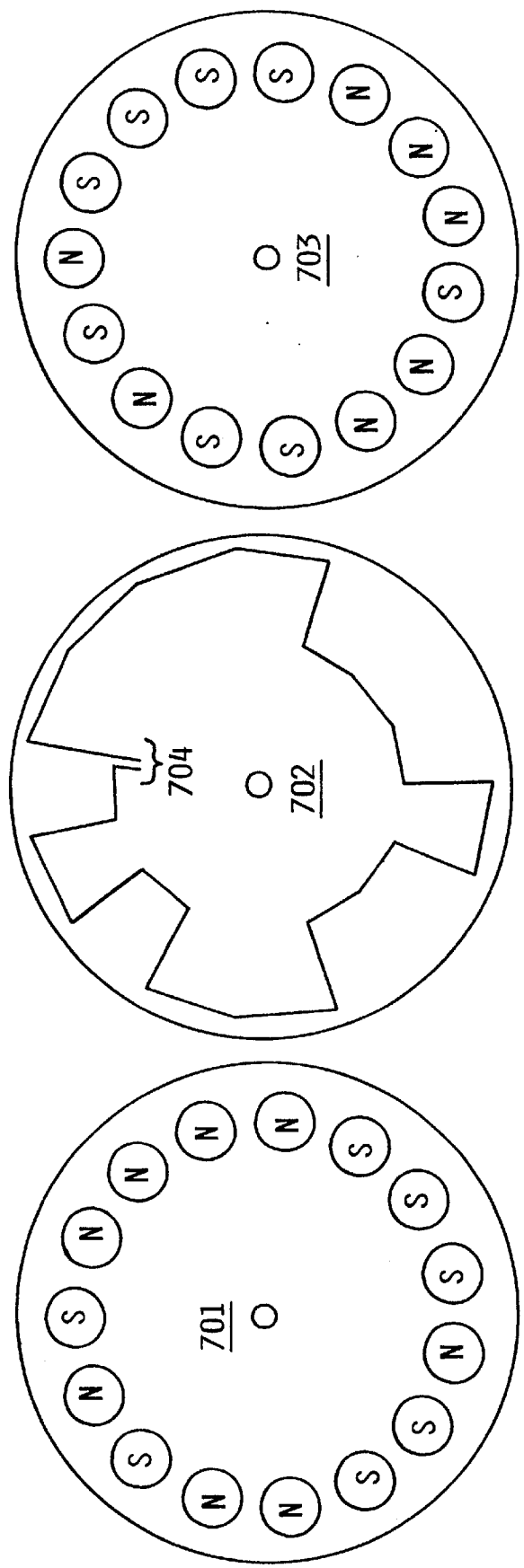
FIG. 7 is a simplified exploded representation of a rotating electro-magnetic device for generating an electric pulse, according to a second set of alternative versions of the preferred embodiment.

FIG. 7 illustrates a further set of alternative generator configurations. In the configurations represented by FIG. 7, the armature and magnetic field apparatus are constructed as disk-shaped members which are mounted centered on and perpendicular to the axis of rotation, the disk-like armature lying substantially parallel to the disk-like magnetic field apparatus. FIG. 7 is an exploded view showing three disks, of which two are permanent magnet field disks 701, 703, and the other is an armature 702. When in place, the armature disk 702 is sandwiched between field disks 701, 703. Although three disks are shown in FIG. 7, it will be understood that the number of disks may vary, and in particular, that the disk design could be expanded to a larger number of interleaved disks on a common axis.

As shown in FIG. 7, the field disks 701, 703 each contain an equal number of equally circumferentially spaced permanent magnet poles. Armature disk 702 contains a conductive winding with two lead wires 704, which forms an equal number of coil poles. Although one winding loop is shown in the simplified illustration of FIG. 7, it will be understood that a larger number of loops is typically used. The designation of poles in FIG. 7 refers to poles opposing the armature disk. The arrangement of poles on disk 703 is exactly the same as on disk 701. In FIG. 7, they appear to be mirror images of each other (i.e., wherever a North pole is shown in disk 701, a corresponding South pole is shown in disk 703) because the direction of orientation is reversed. I.e., if disk 701 is above armature 702 and disk 703 is below armature 702, then a North pole of disk 701 refers to North on the bottom side of disk 701 (facing the armature), implying a South pole on the top side. Similarly, a South pole at the corresponding location on disk 703 refers to a South pole on the top side (facing the armature), and hence is actually identical to disk 701.

As in the case of the multiple variations of FIG. 6, either armature of field may be on the rotor. I.e. disks 701 and 703 may rotate in unison as a rotor, while disk 702 is stationary, or disk 702 may rotate while disks 701 and 703 are stationary. It will further be appreciated that the field disks could alternatively be constructed as electromagnetic coils driven by an electric current source.

An example of an electric generator constructed as multiple disks is shown in U.S. Pat. No. 5,721,461, herein incorporated by reference. Another example of an alternative geometry for an electric motor (the same geometry could be used for an electric generator) may be found in U.S. Pat. No. 5,670,837, herein incorporated by reference.

Operation Using AC Drive Field

Where the driving magnetic field is provided by an electromagnetic winding, it is possible to drive the winding with an AC source. Referring again to FIG. 6 as an example of a field winding (it being understood that the field winding could be constructed differently), it may be observed that, if the rotor is stationary and in the aligned position, then an AC drive current in the field coil generates a time-varying magnetic field of the same frequency as the drive current, which induces an AC voltage of the same frequency in the armature coil. In other words, the device acts as a transformer with a variable magnetic coupling. Rotating the rotor alters the magnetic coupling of the "transformer". In fact, significant coupling between the driving field coil and the armature exists only in the aligned position, with very little coupling between the two in any other position of the rotor. At other than the aligned position, the driving coil and armature are essentially uncoupled.

In this "transformer" mode of operation (with the rotor stationary and the field coil driven by an AC source), the time variance of the driving magnetic field is entirely due to the AC drive source. If the rotor is rotated in this configuration, there will be a time varying element due to the rotor's rotation and a time varying element due to the AC drive source. The relative significance of these factors depending on the relative frequencies of the two time varying elements. When the rotational frequency of the rotor is much less than the frequency of the AC drive source, the device will behave like a pulsed or switched transformer, in which most of the power is supplied by the input driving current of the field coil, and the transformer switches on and off at the rotational frequency of the rotor.

When the rotational frequency of the rotor is much greater than the frequency of the AC drive source, the driving current will be similar to a DC current during the brief intervals in which the rotor is near the aligned position. However, being AC, the magnitude of successive induced voltage pulses will vary with the AC drive voltage.

Where both the rotor and the AC drive source are near the same frequency, both contribute significantly to the time-varying drive field as seen by the armature. In particular, if the AC source and the rotor are properly synchronized, the device should produce a regular stream of pulses synchronous with the rotation of the rotor, which is similar to the case of a DC drive field. The AC drive field component may make it possible to adjust the magnitude or shape of the pulse by controlling the phase of the AC input.

In general, it is expected that a permanent magnet or DC-driven field will be used as the drive field, but there may be specialized applications where the properties of an AC-driven field are desirable.

Exemplary Application: Spark Ignition for Internal Combustion Engine

An electric pulse generator according to the present invention has many potential applications, but a single such application will herein be described. In this exemplary application, the pulse generator is used to provide an ignition spark for an internal combustion engine. While an electric pulse generator as described herein would be usable in virtually any type of spark ignition internal combustion engine, in view of its high reliability and independence of external battery power for ignition, such an electric pulse generator would be particularly suited to use in ignition systems of light aircraft engines.

A spark ignition (as opposed to compression ignition, or Diesel) internal combustion engine ignites a fuel mixture in an enclosed chamber by arcing a synchronized electrical pulse across a gap between two electrodes (a "spark"). Various conventional mechanisms are available for providing the required synchronized pulse. E.g., small engines often use a magneto ignition, which relies entirely on kinetic energy of the moving engine parts for generating the pulse. Most larger engines use the chemical energy of a battery coupled to any of various circuits to produce the pulse. These conventional solutions have certain drawbacks. The magneto typically contains a synchronized mechanical contact switch ("points") for opening an electrical circuit to induce a spark at the proper time. This switch is subject to spark erosion, wear, interference from atmospheric moisture, and other problems associated with moving mechanical parts. Battery ignition circuits obviously require a battery and charging system to maintain it, which is often undesirable for small, portable engines. Circuits which draw power from a battery rely on the continued availability of battery power and the charging system which provides it. I.e., in a motor vehicle, failure of any part of the vehicle's battery, charging or electrical system, may cause failure of the ignition system. This is a particular problem for light aircraft, and for that reason such aircraft often use magneto-based ignition systems which are independent of the aircraft's electrical systems. Finally, although such conventional mechanisms produce sufficient spark to ignite the fuel mixture under normal conditions, there may be benefits to producing a stronger pulse in terms of more complete combustion, improved performance under adverse conditions, utilization of alternative fuels, and so forth.

Figure 8:
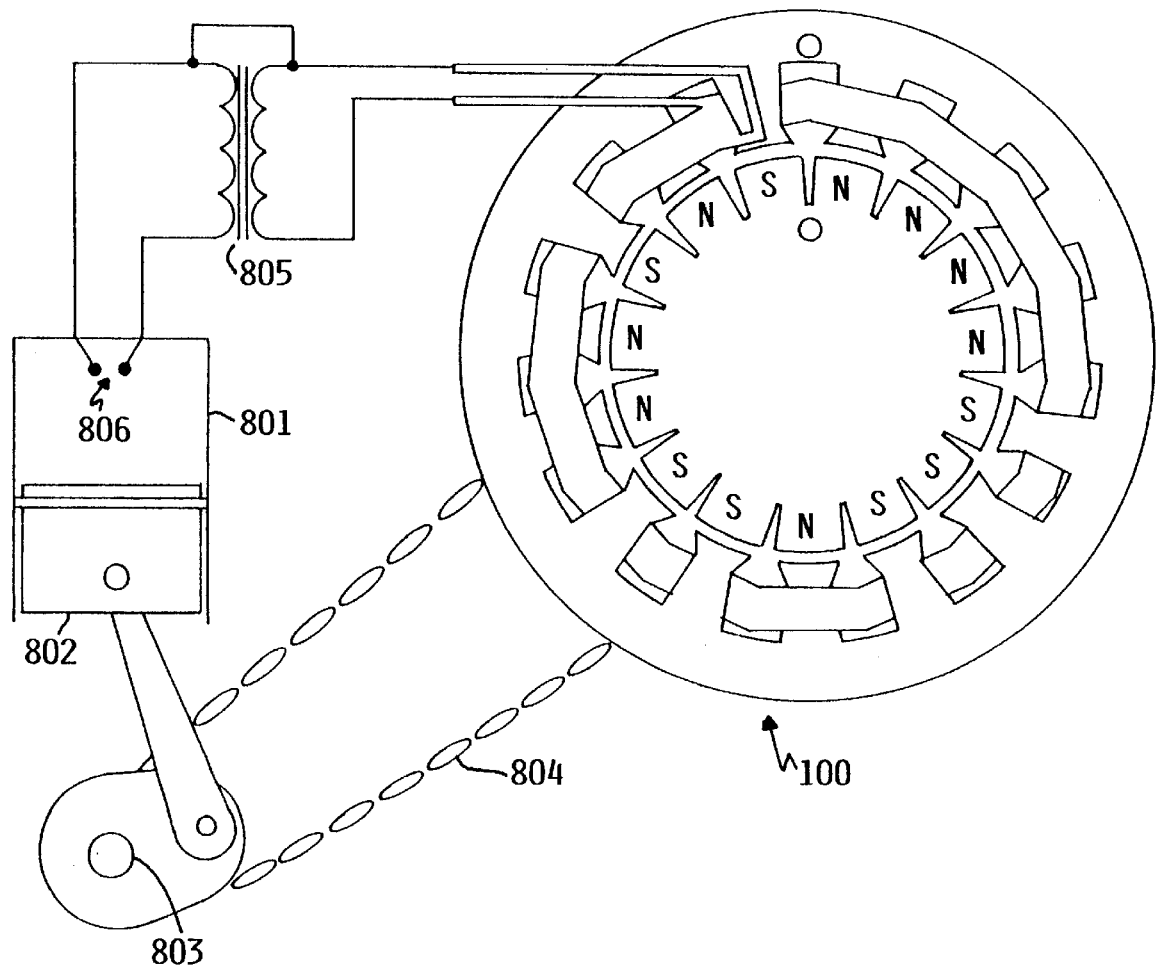
FIG. 8 is a simplified illustration of a spark ignition internal combustion engine employing an electric pulse generator for providing the ignition spark, according to an exemplary application of the generator of the preferred embodiment.

FIG. 8 is a simplified illustration of a spark ignition internal combustion engine employing an electric pulse generator for providing the ignition spark. The engine comprises a combustion chamber 801 enclosed by a movable power member 802. In operation, a fuel mixture is introduced into chamber 801 by any of various fuel mechanisms (not shown), and ignited by an electric spark. The resulting explosion moves the power member under force to generate mechanical power. Power is transmitted to a rotary member 803 (crankshaft) for external application. Although FIG. 8 depicts the power member 802 as a reciprocating piston, it will be appreciated that a power member could alternatively be a wedge-shaped member as used in a so-called Wankel or rotary engine, or might be some other shape.

Pulse generator 100 provides a pulse which is synchronized to the motion of power member 802 and rotary member 803. FIG. 8 depicts a timing chain 804 linking rotary member 803 and generator 100. Timing chain 804 provides drive power to generator 100 by rotating the rotor, the rotation of the rotor being synchronized to the rotation of member 803 to produce the spark at the correct phase of rotation. Although FIG. 8 depicts a timing chain, as is known any number of alternative mechanisms could be used, such as gears and shafts, toothed belts, and so forth, and the rotor of generator 100 may be linked to rotary member 803 through multiple such mechanisms, such as gear coupled to a camshaft, which is in turn driven by a timing chain, as is known in the art. Furthermore, the rotor of generator 100 may in fact be part of a crankshaft so that no intermediate mechanism is necessary.

As explained earlier, when generator 100 reaches its alignment point, an electric pulse is generated. In the embodiment of FIG. 8, this pulse drives a primary circuit of a transformer 805. Transformer 805 drives a secondary circuit at a higher voltage to arc across the spark gap 806 within chamber 801.

FIG. 8 depicts the key electrical components at a conceptual, rather than a structural level. The spark gap 806 is normally formed by a replaceable "spark plug". Transformer 805 may be a separate transformer, or may be integral with a spark plug cap (so-called coil-on-plug technology), or may be structurally integrated with generator 100. Furthermore, the size of the generator 100 and transformer 805 is exaggerated with respect to the combustion chamber. Finally, although a single combustion chamber 801 and power member 802 are shown in FIG. 8, it will be understood that an internal combustion engine employing a generator in accordance with the present invention may have multiple combustion chambers and corresponding power members, each requiring a pulse at a separate cyclic phase of the engine. In this case, the mechanisms which transmit power to and synchronize the rotor may turn the rotor at some multiple of the crankshaft speed, and there may be a distributor, switches, or other mechanisms (not shown) for transmitting a pulse to the desired combustion chamber.

As stated earlier, the pulse should be synchronized to the motion of the power member so that a spark is provided at the proper moment in the cycle (e.g., near the top of a compression stroke). In some internal combustion engine designs, a superfluous spark is also provided at other times, e.g., near the top of an exhaust stroke. These designs are sometimes utilized to simplify the ignition circuitry. For example, in some designs a pair of spark plugs for two different cylinders are connected in series to a common spark producing circuit, the pistons in the two cylinders moving together, but the cylinders being 180° out of phase with respect to an engine cycle, so one cylinder is at the top of its compression stroke when the other is at the top of its exhaust stroke, and vice-versa. The pulse generating apparatus described herein could be used in configurations of this type as well, and as used herein, a "synchronized" pulse merely means that a pulse is produced when required by the engine, whether or not some of the pulses are superfluous.

Referring to FIG. 4, it will be recalled that a pulse in accordance with the preferred embodiment is typically generated as a pair of alternating voltage surges of opposite polarity. This may be undesirable in a spark ignition system of an internal combustion engine, because it may induce a pair of sparks across the electrodes of the spark plug, the current jumping the gap in different directions. This phenomenon could cause undue erosion of the electrodes or other unwanted effects.

Figure 9:
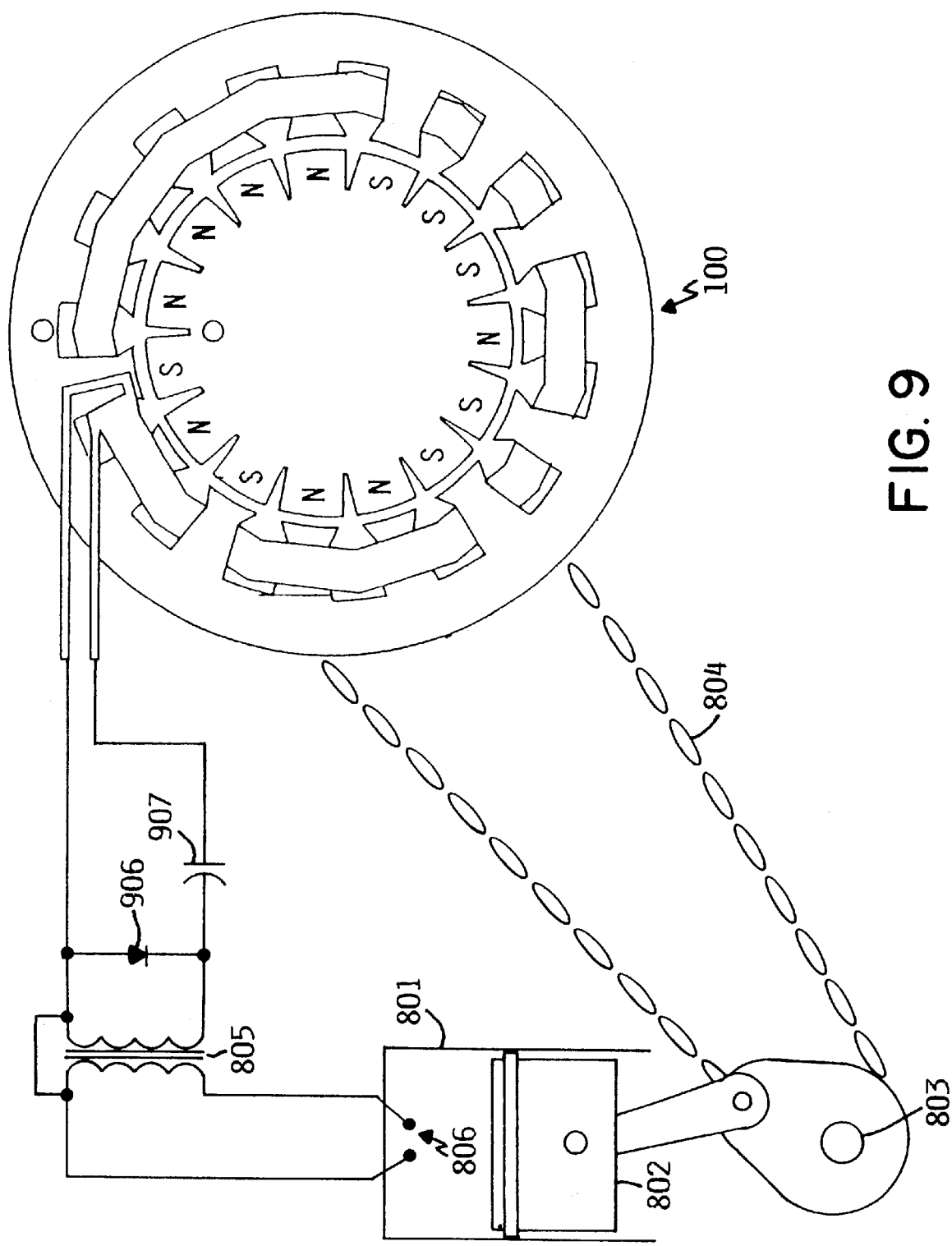
FIG. 9 is a simplified illustration of a spark ignition internal combustion engine employing an electric pulse generator for providing the ignition spark using an alternate ignition circuit, according to an exemplary application of the generator of the preferred embodiment.

An alternative internal combustion engine ignition system which avoids this bi-directional spark is shown in FIG. 9. The engine and ignition system of FIG. 9 is essentially the same as that of FIG. 8, except that an additional diode 906 and capacitor 907 are added to the primary circuit. The effect of these additional components is to generate a current through the primary side of the transformer 805 in only one direction, and therefore the induced spark in the secondary circuit will cross gap 806 in only one direction.

In operation, diode 906 is turned on during the first half of the pulse, causing current to flow through diode 906 and charge capacitor 907, thereby by-passing the primary side of transformer 805. When the polarity of the generated pulse changes during the second half of the pulse, diode 906 turns off. Capacitor 907 is now charged, and its voltage drop is added to that of produced by the generator to drive the primary side of transformer 805, inducing the required spark in gap 806. The capacitance of capacitor 907 is carefully chosen so that it is sufficiently large to absorb most of the energy of the first half of the pulse, without being so large that it is insufficiently charged.

Further Alternative Embodiments and Implementations

A single exemplary implementation, as an ignition source for a spark ignition internal combustion engine, is explained above. However it will be appreciated that a pulse generator in any of the various configurations or modes of operation described herein could be used in a large variety of applications not specifically mentioned. In general, such a pulse generator might be used in any conventional application which requires than an electric pulse be supplied. In addition, it might be used in applications not yet existing or reduced to practice, which also require an electric pulse. As explained earlier, this may include applications for which satisfactory means for generating a requisite pulse are not currently available, but may be supplied by the pulse generator described herein. The following potential applications are listed by way of example only, and are not intended to be limiting: electrical discharge machining; pulse welding; pulsed furnace ignition; various chemical reaction catalyzing applications; nuclear reaction catalyzing applications; rail guns; communications; radar; and warning signals.

In the above description, it has generally been assumed that the rotational speed of the rotor is a fixed value. In fact, the rotational speed may vary, and the purpose of the pulse generator described herein may be to detect or communicate that value. I.e., a pulse generator as described herein may be used as a sensor to detect the rotational speed of the rotor, and possibly to communicate this over distance or in the presence of noise.

As explained above, a rotating electric pulse generator is designed with its poles having a pseudo-random distribution having the property that the poles are aligned to produce an electric pulse at only certain discrete locations (preferably one) in each cycle of revolution, and at other locations the poles are substantially orthogonal, i.e., there is no correlation of magnetic field poles to armature poles, so that little or no net voltage is induced in the armature. In the preferred embodiment, this is accomplished by constructing poles of equal size and spaced at equal intervals, wherein polarity is varied as described above to produce the desired effect. It may alternatively be possible to obtain a similar effect by varying the sizes of poles, the spacing between poles, and other construction details, so that the poles align only at the alignment point, which is preferably once per revolution, and otherwise induce little or no voltage in the armature. Such an asymmetrical design naturally introduces significant design complexities. However, there may be unusual or special applications in which such a design would offer advantages. Furthermore, it would be possible to design a rotating electric pulse generator in accordance with the present invention, in which the number of poles of the armature is not the same as the number of poles of driving magnetic field. In a simple example, the number of armature poles might be twice the number of magnetic field poles, so that each field pole can drive two armature poles in an aligned position. Other simple numerical ratios (e.g.,3:2) may also be possible.

In the various embodiments described above, it has been assumed that there is a single alignment location and that the poles of the rotor align with corresponding polarity poles on the stator only once per revolution to produce a significant pulse. However, it will be recognized that it would alternatively be possible to provide multiple alignment points at which a pulse is produced, the pseudo-random sequence of poles repeating some integral multiple of times around the rotor and stator. Such an implementation might be useful, e.g., in a multi-cylinder internal combustion engine, where for design reasons it is desirable to drive the electric pulse generator from a camshaft or other component which rotates some integral fraction of a revolution for each required electric spark output.

In the various embodiments described above, it has generally been assumed that the rotor rotates at a constant speed. For example, in the electric pulse diagram of FIG. 4, an alternating pulse is shown in which the positive peak is of equal magnitude to the negative peak. In the internal combustion engine described above, the rotor is coupled to the engine crankshaft itself, and rotates at a speed synchronized to the shaft. However, in fact the production of electrical energy in the form of a pulse implies that the energy must come from somewhere, and that energy source is of course the kinetic energy of the rotor. Therefore, the rotor in fact slows down as it induces the pulse and transfers mechanical kinetic energy to electrical energy. The effect on this energy transfer on the speed of the rotor may be negligible, or it may be significant, depending on the design of the generator and the application. In a spark ignition generator for an internal combustion engine, the inertia of the rotor and other engine parts to which it is coupled is usually so great in comparison to the energy of the spark that the energy transfer effected by the generator will typically have negligible effect on the rotational speed of the rotor. In other applications, the rotor may slow down very significantly as a result of the energy transfer. In the ultimate case, it may even be possible to construct a generator in which the rotor stops dead in its tracks, although construction of such a device may encounter physical limitations caused by magnetic saturation of core materials and so forth. Where the generation of a pulse causes a significant drop in the rotor speed, the characteristic pulse profile of FIG. 4 may take on a different appearance.

In the various embodiments described above, it has generally been assumed that the generator induces a stream of pulses coinciding with the rotational speed of the rotor. However, in some applications it may be desirable to induce a single large pulse, and to accelerate the rotor to a high speed, which may require multiple revolutions, before generating the pulse. In these applications, it would be possible to operate in a switched mode. For example, a field coil may initially be open-circuited with no current driven through it. After acceleration of the rotor to a desired speed, a switch may be closed, providing current to the field coil. At the next alignment point, a pulse will be generated. Alternatively, the armature coil may be open-circuited and switched to the intended load when the desired speed is reached.

In the various embodiments described above, the electric pulse generator 100 and variations thereof have generally been described as an isolated entity. In some variations, notably those shown in FIG. 6, it is expected that an external power source provide electrical power (preferably DC power) to the field coils in order to generate an appropriate driving magnetic field. It will be appreciated that this might be accomplished using a compound form of generator, in which two rotors of two separate generators are mounted on a common rotating member. For example, in such an implementation, a first generator might generate power for the field coil of a second generator, which might be mounted on the rotor of the second generator. The first generator might be a conventional generator which provides continuous power (either DC or AC), while the second generator is a pulse generator as described herein. Alternatively, it may be possible to construct both generators as pulse generators as described herein.

In the various embodiments described above, the electric pulse generator has been described as a rotary device in which relative motion between a magnetic driving field apparatus and a driven (armature) coil is provided by rotating one of these elements with respect to the other about an axis. However, it will be recognized that, for certain specialized applications, the same design principles might be applied to other forms of relative motion, specifically linear relative motion. For example, a moving member having M poles might move linearly along a fixed member having some larger number of poles in a polarity sequence which repeats every M poles. One possible application for such a device, although not necessarily the only such application, might be a pulsing sensor for detecting the position and/or velocity of the moving member.

Although a specific embodiment of the invention has been disclosed along with certain alternatives, it will be recognized by those skilled in the art that additional variations in form and detail may be made within the scope of the following claims:

What is claimed is:

1. An electric pulse generating apparatus, comprising:
   a rotor;
   an electromagnetic armature comprising an electrical conductor arranged in a plurality of poles, each pole having a respective polarity;

a magnetic field apparatus having a plurality of poles, each pole having a respective polarity;

wherein one of said electromagnetic armature and said magnetic field apparatus is mounted on said rotor and the other of said electromagnetic armature and said magnetic field apparatus is not mounted on said rotor, said electromagnetic armature and said magnetic field apparatus being mounted to rotate with respect to each other;

wherein said poles of said armature and said magnetic field apparatus are arranged according to a pseudo-random distribution, such that the poles of said armature are substantially aligned with the poles of said magnetic field apparatus of a corresponding polarity at one or more discrete angular aligned positions of said rotor to produce a relatively large net flux through said armature, and produce a relatively small net flux through said armature at angular positions of said rotor other than said one or more discrete angular aligned positions.

2. The electric pulse generating apparatus of claim 1, wherein the poles of said armature are substantially aligned with the poles of said magnetic field apparatus of a corresponding polarity at exactly one angular position of said rotor.

3. The electric pulse generating apparatus of claim 1, wherein said armature is mounted on said rotor and said magnetic field apparatus is mounted on a stator.

4. The electric pulse generating apparatus of claim 1, wherein said armature is mounted on a stator and said magnetic field apparatus is mounted on said rotor.

5. The electric pulse generating apparatus of claim 1, wherein said magnetic field apparatus comprises an electrical conductor arranged in said plurality of poles and driven by an electrical power source.

6. The electric pulse generating apparatus of claim 5, wherein said electrical power source driving said magnetic field apparatus is a constant DC source.

7. The electric pulse generating apparatus of claim 5, wherein said electrical power source driving said magnetic field apparatus is a continuous AC source.

8. The electric pulse generating apparatus of claim 5, wherein said electrical power source driving said magnetic field apparatus is a switched source which is initially off and which is switched on to provide at least one pulse after said rotor has reached a desired rotational velocity.

9. The electric pulse generating apparatus of claim 1, wherein said magnetic field apparatus comprises a plurality of permanent magnets.

10. The electric pulse generating apparatus of claim 1, wherein said poles of said armature are of equal size and are arranged surrounding said axis at equal circumferential intervals, and wherein said poles of said magnetic field apparatus are of equal size and are arranged surrounding said axis at equal circumferential intervals.

11. The electric pulse generating apparatus of claim 10, wherein the number of poles of said armature is that same as the number of poles of said magnetic field apparatus.

12. The electric pulse generating apparatus of claim 1, wherein said electric pulse generating apparatus operates in a switched mode, wherein an output of said electric pulse generating apparatus is initially in an open circuit configuration, and said output is switchably coupled to a load to provide at least one pulse after said rotor has reached a desired rotational velocity.

13. The electric pulse generating apparatus of claim 1, wherein said electric pulse generating apparatus operates in a continuous mode, wherein an output of said electric generating apparatus provides a continuous stream of pulses corresponding to said rotor rotating past said one or more discrete angular aligned positions.

14. An electric pulse generating apparatus, comprising:

a rotor;

a magnetic field apparatus having M equally circumferentially spaced poles arranged around an axis, each of said M poles of said magnetic field apparatus having a respective polarity, the polarity of each successive pole of said magnetic field apparatus corresponding to a respective successive element of a pseudo-random binary sequence;

an armature comprising an electrical conductor arranged in M equally circumferentially spaced poles arranged around said axis, each of said M poles of said armature having a respective polarity, the polarity of each successive pole of said armature corresponding to a respective successive element of said pseudo-random binary sequence; and wherein one of said armature and said magnetic field apparatus is mounted on said rotor and the other of said armature and said magnetic field apparatus is not mounted on said rotor, said armature and said magnetic field apparatus being mounted to rotate with respect to each other.

15. The electric pulse generating apparatus of claim 14, wherein said pseudo-random binary sequence is a cyclic sequence having M elements per cycle.

16. The electric pulse generating apparatus of claim 14, wherein said armature is mounted on said rotor and said magnetic field apparatus is mounted on a stator.

17. The electric pulse generating apparatus of claim 14, wherein said armature is mounted on a stator and said magnetic field apparatus is mounted on said rotor.

18. The electric pulse generating apparatus of claim 14, wherein said magnetic field apparatus comprises an electrical conductor arranged in said plurality of poles and driven by an electrical power source.

19. The electric pulse generating apparatus of claim 14, wherein said magnetic field apparatus comprises a plurality of permanent magnets.

20. The electric pulse generating apparatus of claim 14, wherein said pseudo-random binary sequence is a pseudo-noise binary sequence.

21. The electric pulse generating apparatus of claim 20, wherein said pseudo-random binary sequence is an m-sequence of a primitive polynomial.

22. The electric pulse generating apparatus of claim 14, wherein said electric pulse generating apparatus operates in a switched mode, wherein an output of said electric pulse generating apparatus is initially in an open circuit configuration, and said output is switchably coupled to a load to provide at least one pulse after said rotor has reached a desired rotational velocity.

23. The electric pulse generating apparatus of claim 14, wherein said electric pulse generating apparatus operates in a continuous mode, wherein an output of said electric generating apparatus provides a continuous stream of pulses corresponding to said rotor rotating past said one or more discrete angular aligned positions.

24. A rotary electric pulse generating apparatus, comprising:

an electromagnetic armature comprising an electrical conductor arranged in at least three poles;

a magnetic field apparatus having a plurality of poles;

wherein said electromagnetic armature and said magnetic field apparatus are mounted to rotate with respect to each other; and wherein said apparatus produces a single electrical pulse exactly once per revolution of said armature with respect to said magnetic field apparatus.

25. The rotary electric pulse generating apparatus of claim 24, wherein said armature is mounted on a rotor and said magnetic field apparatus is mounted on a stator.

26. The rotary electric pulse generating apparatus of claim 24, wherein said armature is mounted on a stator and said magnetic field apparatus is mounted on a rotor.

27. The rotary electric pulse generating apparatus of claim 24, wherein said magnetic field apparatus comprises an electrical conductor arranged in said plurality of poles and driven by an electrical power source.

28. The rotary electric pulse generating apparatus of claim 24, wherein said magnetic field apparatus comprises a plurality of permanent magnets.

29. The rotary electric pulse generating apparatus of claim 24, wherein said poles of said armature are of equal size and are arranged surrounding said axis at equal circumferential intervals, and wherein said poles of said magnetic field apparatus are of equal size and are arranged surrounding said axis at equal circumferential intervals.

30. The electric pulse generating apparatus of claim 29, wherein the number of poles of said armature is the same as the number of poles of said magnetic field apparatus.

31. A variably coupled rotary electromagnetic apparatus, comprising:

a first electromagnetic winding comprising an electrical conductor arranged in M poles surrounding a rotational axis, each pole having a respective polarity;

a second electromagnetic winding comprising an electrical conductor arranged in M poles surrounding said rotational axis, each pole having a respective polarity;

wherein said first and second electromagnetic windings are mounted to rotate with respect to each other; and wherein, at an aligned position of said first electromagnetic winding with respect to said second electromagnetic winding, each of said M poles of said of said first winding is coupled to a respective pole of the same polarity of said second winding, and at all other positions of said first electromagnetic winding with respect to said second electromagnetic winding, said first electromagnetic winding and said second electromagnetic winding are substantially uncoupled.

32. The variably coupled rotary electromagnetic apparatus of claim 31, wherein the polarity of each successive pole of said first electromagnetic winding corresponds to a respective successive element of a pseudo-random binary sequence, and wherein the polarity of each successive pole of said second electromagnetic winding corresponds to a respective successive element of said pseudo-random binary sequence.

33. The variably coupled rotary electromagnetic apparatus of claim 32, wherein said pseudo-random binary sequence is a cyclic sequence having M elements per cycle.

34. The variably coupled rotary electromagnetic apparatus of claim 32, wherein said pseudo-random binary sequence is a pseudo-noise binary sequence.

35. The variably coupled rotary electromagnetic apparatus of claim 34, wherein said pseudo-random binary sequence is an m-sequence of a primitive polynomial.

36. The variably coupled rotary electromagnetic apparatus of claim 31, wherein said first electromagnetic winding is driven by a DC source and said second electromagnetic winding is driven by a magnetic field generated by said first electromagnetic winding.

37. The variably coupled rotary electromagnetic apparatus of claim 31, wherein said first electromagnetic winding is driven by an AC source and said second electromagnetic winding is driven by a magnetic field generated by said first electromagnetic winding.

38. The variably coupled rotary electromagnetic of claim 31, wherein said first electromagnetic winding is driven by a switched source which is initially off and which is switched on after said rotor has reached a desired rotational velocity, and said second electromagnetic winding is driven by a magnetic field generated by said first electromagnetic winding when said switched source is switched on.

39. A rotary electric pulse generating apparatus, comprising:

an electromagnetic armature comprising an electrical conductor arranged as M poles surrounding a rotational axis;

a magnetic field apparatus having a plurality of poles surrounding said rotational axis;

wherein said electromagnetic armature and said magnetic field apparatus are mounted to rotate with respect to each other about said rotational axis; and wherein said apparatus produces exactly P electrical pulses per revolution of said armature with respect to said magnetic field apparatus, where P<M/2.

40. The rotary electric pulse generating apparatus of claim 39, wherein P=1.

41. The rotary electric pulse generating apparatus of claim 39, wherein said armature is mounted on a rotor and said magnetic field apparatus is mounted on a stator.

42. The rotary electric pulse generating apparatus of claim 39, wherein said armature is mounted on a stator and said magnetic field apparatus is mounted on a rotor.

43. The rotary electric pulse generating apparatus of claim 39, wherein said magnetic field apparatus comprises an electrical conductor arranged in said plurality of poles and driven by an electrical power source.

44. The rotary electric pulse generating apparatus of claim 39, wherein said magnetic field apparatus comprises a plurality of permanent magnets.

45. The electric pulse generating apparatus of claim 39, wherein said poles of said armature are of equal size and are arranged surrounding said axis at equal circumferential intervals, and wherein said poles of said magnetic field apparatus are of equal size and are arranged surrounding said axis at equal circumferential intervals.

46. The electric pulse generating apparatus of claim 39, wherein said magnetic field apparatus is arranged as M poles.

47. The electric pulse generating apparatus of claim 39, wherein each said pole of said electromagnetic armature has a respective polarity, and the of respective polarities of a circumferential sequence of said poles corresponds to a pseudo-random binary sequence.

48. An internal combustion engine, comprising:

at least one combustion chamber;

a respective moveable power member in each said at least one combustion chamber, each said moveable power member enclosing its respective combustion chamber;

a spark ignition apparatus, comprising:

(a) a rotor rotating about an axis and synchronized to the motion of said at least one moveable power member;

(b) a magnetic field apparatus having a plurality of poles;

(c) an electromagnetic armature comprising an electrical conductor arranged in a plurality of poles, wherein one of said electromagnetic armature and said magnetic field apparatus is mounted on said rotor and the other of said electromagnetic armature and said magnetic field apparatus is not mounted on said rotor, said electromagnetic armature and said magnetic field apparatus being mounted to rotate with respect to each other, wherein said poles of said armature are arranged according to a pseudo-random distribution to produce an electric pulse synchronized to the motion of said at least one moveable power member; and (d) a spark ignition circuit coupled to said electromagnetic armature, said spark ignition circuit providing a synchronized spark to said at least one combustion chamber.

49. The internal combustion engine of claim 48, wherein said engine is designed for use in powering an aircraft.

50. The internal combustion engine of claim 48, wherein said armature of said spark ignition apparatus produces exactly one pulse with each revolution of said rotor.

51. The internal combustion engine of claim 48, wherein said armature is mounted on a stator and said magnetic field apparatus is mounted on said rotor.

52. The internal combustion engine of claim 48, wherein said magnetic field apparatus comprises a plurality of permanent magnets.

53. The internal combustion engine of claim 48, wherein said poles of said armature are of equal size and are arranged surrounding said axis at equal circumferential intervals, and wherein said poles of said magnetic field apparatus are of equal size and are arranged surrounding said axis at equal circumferential intervals.

54. The internal combustion engine of claim 53, wherein the number of poles of said armature is that same as the number of poles of said magnetic field apparatus.

55. The internal combustion engine of claim 48, wherein said spark ignition circuit comprises a capacitor and a diode connected in series between a first output lead of said electromagnetic armature and a second output lead of said electromagnetic armature, a spark load being connected in parallel with said diode.

56. An internal combustion engine, comprising:
   at least one combustion chamber;
   a respective moveable power member in each said at least one combustion chamber, each said moveable power member enclosing its respective combustion chamber;
   a spark ignition apparatus, comprising:
   (a) a rotor rotating about an axis and synchronized to the motion of said at least one moveable power member;
   (b) a magnetic field apparatus comprising a plurality of permanent magnets arranged as a M equally circumferentially spaced poles, each pole having a respective polarity, the sequence of polarity of said poles being pseudo-random;
   (c) an electromagnetic armature comprising an electrical conductor arranged as M equally circumferentially spaced of poles, each pole having a respective polarity, the sequence of polarity of said poles being pseudo-random, wherein one of said electromagnetic armature and said magnetic field apparatus is mounted on said rotor and the other of said electromagnetic armature and said magnetic field apparatus is not mounted on said rotor, said electromagnetic armature and said magnetic field apparatus being mounted to rotate with respect to each other, wherein said poles of said armature and said magnetic field apparatus align at periodic intervals to produce an electric pulse synchronized to the motion of said at least one moveable power member; and (d) a spark ignition circuit coupled to said electromagnetic armature, said spark ignition circuit providing a synchronized spark to said at least one combustion chamber.

57. The internal combustion engine of claim 56, wherein said engine is designed for use in powering an aircraft.

58. The internal combustion engine of claim 56, wherein said electromagnetic armature produces exactly one pulse with each revolution of said rotor.

59. The internal combustion engine of claim 56, wherein said armature is mounted on a stator and said magnetic field apparatus is mounted on said rotor.

60. The internal combustion engine of claim 56, wherein said spark ignition circuit comprises a capacitor and a diode connected in series between a first output lead of said electromagnetic armature and a second output lead of said electromagnetic armature, a spark load being connected in parallel with said diode.

61. The internal combustion engine of claim 56, wherein said sequence of polarity of said poles of said armature corresponds to a cyclic pseudo-random binary sequence having M elements per cycle.

62. The internal combustion engine of claim 61, wherein said cyclic pseudo-random binary sequence is an m-sequence of a primitive polynomial.

63. An electric pulse generating apparatus, comprising:
   a first member having a first multiplicity of magnetic poles organized in a pseudo-random distribution;
   a second member having a second multiplicity of poles organized in a pseudo-random distribution and an electrical winding thereon, said second member being disposed for relative movement with respect to said first member;
   such that during said relative movement an electrical pulse is formed within said electrical winding when said first multiplicity of magnetic poles and said second multiplicity of magnetic poles are in relative alignment.

64. The electric pulse generating apparatus of claim 63, wherein said first member is a moving member and said second member is a stationary member.

65. The electric pulse generating apparatus of claim 63, wherein said first member is a stationary member and said second member is a moving member.

66. The electric pulse generating apparatus of claim 63, wherein said first member comprises an electrical conductor arranged in said plurality of poles and driven by an electrical power source.

67. The electric pulse generating apparatus of claim 63, wherein said first member comprises a plurality of permanent magnets.

68. The electric pulse generating apparatus of claim 63, wherein each of said first multiplicity of poles has a respective polarity corresponding to a respective successive element of a pseudo-random binary sequence, and wherein each of said second multiplicity of poles has a respective polarity corresponding to a respective successive element of said pseudo-random binary sequence.

69. The electric pulse generating apparatus of claim 68, wherein said pseudo-random binary sequence is a cyclic sequence having M elements per cycle.

70. The electric pulse generating apparatus of claim 68, wherein said pseudo-random binary sequence is an m-sequence of a primitive polynomial.

* * * * *